United States Patent
Tang et al.

(10) Patent No.: US 9,626,568 B2
(45) Date of Patent: Apr. 18, 2017

(54) USE OF SPATIALLY STRUCTURED LIGHT FOR DYNAMIC THREE DIMENSIONAL RECONSTRUCTION AND REALITY AUGMENTATION

(71) Applicant: Rowan University, Glassboro, NJ (US)

(72) Inventors: Ying Tang, Cherry Hill, NJ (US); Bingyao Huang, Voorhees, NJ (US)

(73) Assignee: Rowan University, Glassboro, NJ (US)

( * ) Notice: Subject to any disclaimer, the term of this patent is extended or adjusted under 35 U.S.C. 154(b) by 231 days.

(21) Appl. No.: 14/554,130

(22) Filed: Nov. 26, 2014

(65) Prior Publication Data
US 2015/0145959 A1    May 28, 2015

Related U.S. Application Data

(60) Provisional application No. 61/908,819, filed on Nov. 26, 2013.

(51) Int. Cl.
| | |
|---|---|
| *H04N 13/02* | (2006.01) |
| *H04N 5/77* | (2006.01) |
| *G06K 9/00* | (2006.01) |
| *G06T 7/00* | (2017.01) |
| *G06T 7/20* | (2017.01) |

(52) U.S. Cl.
CPC ........ *G06K 9/00711* (2013.01); *G06T 7/0057* (2013.01); *G06T 7/0071* (2013.01); *G06T 7/2033* (2013.01); *H04N 13/0253* (2013.01)

(58) Field of Classification Search
CPC .. G01B 11/254; H04N 13/0203; G06T 7/004; G06T 7/2086; G06K 9/00711
USPC .......... 348/46, 47, 49, 60, 70; 386/200, 223, 386/224, 226, 227, 230
See application file for complete search history.

(56) References Cited

U.S. PATENT DOCUMENTS

| | | | |
|---|---|---|---|
| 2011/0164063 A1* | 7/2011 | Shimotani | ............. G06F 3/0416 345/661 |
| 2014/0267626 A1* | 9/2014 | Lilagan | .............. H04N 5/23216 348/46 |

* cited by examiner

*Primary Examiner* — Robert Chevalier
(74) *Attorney, Agent, or Firm* — Fox Rothschild LLP

(57) ABSTRACT

The disclosure relates to marker-less augmented reality methods which are operable in mobile applications and which involve an object-tracking method that uses projection and detection of a structured light pattern to track the location, orientation, and/or movement of an object in a scene.

13 Claims, 17 Drawing Sheets
(9 of 17 Drawing Sheet(s) Filed in Color)

Fig. 5

USE OF SPATIALLY STRUCTURED LIGHT FOR DYNAMIC THREE DIMENSIONAL RECONSTRUCTION AND REALITY AUGMENTATION

CROSS-REFERENCES TO RELATED APPLICATIONS

This application is entitled to priority to U.S. provisional patent application No. 61/908,819 filed 26 Nov. 2013.

BACKGROUND OF THE DISCLOSURE

The invention relates generally to the field of three-dimensional imaging and positioning.

Augmented reality (AR) superimposes computer-generated three-dimensional (3D) graphics or two-dimensional (2D) information on a user's view of a surrounding environment in real-time, enhancing the user's perception of the real world. The goal of an AR application could be to complement existing information in the scene, such as overlaying augmented text on an historic building (D. Scagliarini et al., "Exciting understanding in Pompeii through on-site parallel interaction with dual time virtual models," Proc. Eurographics-Siggraph Virtual Reality, Archaeology, and Cultural Heritage Ann. Conf. (VAST01), in press; 2001) or giving more educational information in a museum (F. Mata, C. Claramunt, A. Juarez, "An experimental virtual museum based on augmented reality and navigation," Proceedings of the 19th ACM SIGSPATIAL International Conference on Advances in Geographic Information Systems, November 2011; R. Wojciechowski, K. Walczak, M. White, W. Cellary, "Building virtual and augmented reality museum exhibitions", Proceedings of the ninth international conference on 3D Web technology, April 2004; E. Woods et al., "Augmenting the science centre and museum experience", Proceedings of the 2nd international conference on Computer graphics and interactive techniques in Australasia and South East Asia, June 2004) or a book (S. Lee, J. Choi, and J. Park, "Interactive e-learning system using pattern recognition and augmented reality," IEEE Transactions on Consumer Electronics, vol. 55, no. 2, May 2009). Another purpose could be to simply draw attention to the virtual data such as an entertainment game.

Regardless of the field for which the application is applied, or its primary purpose in the scene, many AR pipelines share two primary goals, the first being range-finding the environment (e.g., knowing a depth, precise 3D coordinates, or a camera pose estimation), and the second being registration and tracking of the 3D environment, such that relative movement of the environment with respect to the camera can be followed. Both range-finding and tracking can be done using a black and white fiducial marker or some known parameters about the scene in order to triangulate corresponding points. The former method is referred to as a marker-based AR system while the latter is known as a marker-less system.

Marker based systems pose sometimes unwanted objects on the outputting video frame which can reduce the visual aesthetic or get in the way of a desired view, particularly in mobile devices where resolution and/or field of view is limited. It is often preferable to employ a marker-less system so as not to disturb the user's experience in a mobile scenario.

Existing marker-less AR applications extract pre-stored spatial information from objects followed by mapping invariant feature points to calculate the pose (V. Teichrieb et al., "A survey of online monocular markerless augmented reality", International Journal of Modeling and Simulation or the Petroleum Industry, vol. 1, no. 1, p. 1-7, August 2007; Joao Paulo Lima et al., "Model based 3D tracking techniques for markerless augmented reality," SVR, SBC, Porto Alegre, pp. 37-47, 2009; Andrew I. Comport, Eric Marchand, and Francois Chaumette, "A real-time tracker for markerless augmented reality," in ISMAR '03, pp. 36-45, 2003).

Other attempts to implement a marker-less AR system utilize a technique known as structure from motion (SFM), which try to work on a completely unknown scene and use motion analysis and some camera parameters to calculate the pose estimation (e.g., Andrew J. Davison, Ian D. Reid, Nicholas D. Molton, and Olivier Stasse, "MonoSLAM: Real-time single camera SLAM," IEEE Transactions on Pattern Analysis and Machine Intelligence, vol. 26, no. 6, June 2007; M. Lourakis, A. Argyros, "Efficient, causal camera tracking in unprepared environments," Computer Vision and Image Understanding, v. 99, p. 259-290, 2005). In these cases, at least some amount of the spatial environment needs to be known either a priori, or in a sequence of video frames, to accomplish the actual range-finding goal.

SFM methods accomplish tracking in parallel to range-finding, as they require suitable tracking to accomplish range-finding in the first place. In addition, some methods still require an initialization stage in which the user must hold up a known target to calibrate the system (e.g., Andrew J. Davison, Ian D. Reid, Nicholas D. Molton, and Olivier Stasse, "MonoSLAM: Real-time single camera SLAM," IEEE Transactions on Pattern Analysis and Machine Intelligence, vol. 26, no. 6, June 2007).

Structured light three-dimensional (3D) reconstruction has been well studied in the past few decades due to its wide applications in reverse engineering (S. C. Park and M. Chang, "Reverse engineering with a structured light system," Computers & Industrial Engineering, vol. 57, no. 4, pp. 1377-1384, 2009), augmented reality (M. Torres, R. Jassel, and Y. Tang, "Augmented reality using spatially multiplexed structured light," in Mechatronics and Machine Vision in Practice (M2VIP), 2012 19th International Conference, November 2012, pp. 385-390), medical imaging (O. V. Olesen, R. R. Paulsen, L. Hojgaard, B. Roed, and R. Larsen, "Motion tracking for medical imaging: a nonvisible structured light tracking approach," Medical Imaging, IEEE Transactions on, vol. 31, no. 1, pp. 79-87, 2012) and archaeological finds (S. P. McPherron, T. Gernat, and J.-J. Hublin, "Structured light scanning for high-resolution documentation of $_i$ i $_i$ in situ $_i$/i$_i$ archaeological finds," Journal of Archaeological Science, vol. 36, no. 1, pp. 19-24, 2009).

In terms of codification strategy, structured light can be classified into four general types: discrete spatial multiplexing, time-multiplexing, continuous frequency multiplexing and continuous spatial multiplexing (J. Salvi, S. Fernandez, T. Pribanic, and X. Llado, "A state of the art in structured light patterns for surface profilometry," Pattern recognition, vol. 43, no. 8, pp. 2666-2680, 2010). Most of the early work focus on a temporal approach that requires multiple patterns to be projected consecutively onto stationary objects. Obviously, such a requirement makes temporal approaches unsuitable for mobile and real-time applications.

Recently, researchers have devoted much effort to speeding up the data acquisition process by designing techniques that need only a handful of input images or even a single one, so-called one-shot 3D image acquisition.

For example, Zhang et al: ("Rapid shape acquisition using color structured light and multi-pass dynamic programming," in 3D Data Processing Visualization and Transmission, 2002. Proceedings. First International Symposium on. IEEE, 2002, pp. 24-36) propose a multi-pass dynamic programming algorithm to solve the multiple hypothesis code mating problem and successfully apply to both one-shot and spacetime methods.

Others (A. Ulusoy, F. Calakli, and G. Taubin, "Robust one-shot 3d scanning using loopy belief propagation," in Computer Vision and Pattern Recognition Workshops (CVPRW), 2010 IEEE Computer Society Conference on, June 2010, pp. 15-22) model a spatial structure light system using a probabilistic graphical formulation with epipolar, coplanarity and topologic constraints. They then solve the correspondence problem by finding a maximum posteriori a loopy belief propagation.

Kawasaki et al: ("Dynamic scene shape reconstruction using a single structured light pattern," in Computer Vision and Pattern Recognition, 2008. CVPR 2008. IEEE Conference on, June 2008, pp. 1-8) use a bicolor grid and local connectivity information to achieve dense shape reconstruction. Given that the proposed technique does not involve encoding positional information into multiple pixels or color spaces, it provides good results even when discontinuities and/or occlusions are present.

Similarly, Chen et al: ("Vision processing for realtime 3-d data acquisition based on coded structured light," Image Processing, IEEE Transactions on, vol. 17, no. 2, pp. 167-176, February 2008) present a specially-coded vision system where a principle of uniquely color-encoded pattern is proposed to ensure the reconstruction efficiency using local neighborhood information.

To improve color detection, Fechteler and Eisert (P. Fechteler and P. Eisert, "Adaptive color classification for structured light systems," in Computer Vision and Pattern Recognition Workshops, 2008. CVPRW '08. IEEE Computer Society Conference on, June 2008, pp. 1-7) propose a color classification method where the color classification is made adaptive to the characteristics of the captured image, so distortion due to environment illumination, color crosstalk, and reflectance is well compensated.

In spite of the aforementioned developments, there is still space to further improve one-shot methods, particularly in terms of speed, to be sufficient enough for real-time applications as many existing approaches involve expensive algorithms. For example, As reported in Ulusoy et al., it takes 10 iterations for the method to converge, which costs about 3 minutes to recover thousand intersections. Similarly, the approach in Fechteler and Eisert takes a minute to reconstruct an object with 126544 triangles and 63644 vertices.

BRIEF SUMMARY OF THE DISCLOSURE

The disclosure relates to a method of tracking an object in a scene. The method includes steps of first i) detecting at least three points of an object in a scene and ii) using a projector to project structured light pattern on the scene, and then iii) using an imaging device to capture an image of the scene including the object and the structured light pattern and iv) calculating the positions, relative to the imaging device, of at least the three points. The structured light pattern including intersecting monochromatic lines, wherein at least six of the lines are different colors. The positions of the points is calculated using a four-step process, including a) detecting the intersections of the lines in the image, b) traversing through the detected intersections to identify neighboring nodes, c) determining the identity of each detected intersection based on its color and the color of its neighboring nodes, and d) triangulating the position of intersections corresponding to the at least the three points.

The structured light pattern can be a DeBruijn grid, such as one that includes lines of at least eight different colors. The method can be used repeatedly to track the object over time.

The disclosure also relates to a system for tracking an object in a scene. The system includes i) a projector for projecting a structured light pattern on the scene, an imaging device for capturing an image of the scene, a first processor for coordinating operation of the projector and the imaging device, and a second processor (which can be the same as the first) for calculating the positions, relative to the imaging device. The system can be part of a hand-held device, such as a multi-purpose cellular telephone (i.e., a "smart" phone) or part of a navigation system in a vehicle, for example.

The disclosure also relates to a device for displaying contextual information on a device when the device is situated in a selected proximity to an object. The device includes i) a projector for projecting a structured light pattern toward the object, ii) an imaging device for capturing an image including the object and the structured light pattern, iii) a display for displaying an image of the object and the contextual information, and at least one processor for a) calculating the proximity of the display device to the object and b) displaying the contextual information on the display when the device is situated within the selected proximity.

BRIEF SUMMARY OF THE SEVERAL VIEWS OF THE DRAWINGS

This patent application contains at least one drawing executed in color. Copies of this patent or patent application publication with color drawing(s) will be provided by the Office upon request and payment of the necessary fee.

FIG. 5 lists a Hamming-Distance-Based Amendment Algorithm described herein.

FIG. 7A), a gray flood capture of the ROI (FIG. 7B), and a BW grid capture of the ROI (FIG. 7C).

DETAILED DESCRIPTION

Figure 1:
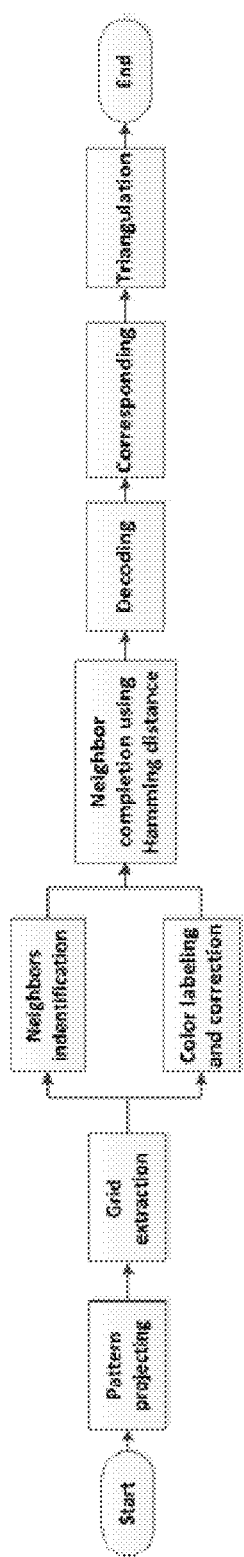
FIG. 1 is a flow chart depicting the system architecture of the marker-less augmented reality system which employs structured light, described herein.

In one aspect, this disclosure relates to augmented reality systems.

Augmented reality (AR) superimposes computer-generated 3-D graphics or 2-D information on the user's view of a surrounding environment in real time, enhancing the user's perception of the real world. Typical AR systems either use fiducial markers or information about an object in the scene for AR tracking. The former, called marker-based AR, requires artificial markers be placed in the scene to be tracked by the system. When applied to mobile applications, these markers clutter the small view in the mobile device. Often times in the latter method (marker-less AR) there is a requirement for offline training of some sort making it unsuitable for unprepared environments. In applications which do not have these requirements, such as structure from motion (SFM) approaches, there can still be the requirement of an initial reference object in the application.

The subject matter disclosed herein, by contrast, focuses on marker-less AR in mobile applications and involves a tracking method using structured light (SL). The architecture consists of a three-stage process. In the first stage, invariant feature tracking methods are implemented to track real regions between successive video frames. Spatially multiplexed SL, involving projecting a known active image onto a scene, is used to extract 3D range data from a captured image in the second stage. The final stage utilizes the captured 3D data and tracking information to impose AR activities into the live video.

In another aspect, this disclosure relates to dynamic 3D reconstruction techniques.

SL is popular in 3D reconstruction applications due to its robustness against outliers. In the last few decades, a number of high-accuracy, temporally encoded SL-based techniques emerged to solve the 3D reconstruction problem. However their applications are mainly limited to scanning stationary objects.

When dealing with dynamic scenes and real-time data acquisition, one-shot spatial multiplexed SL has a speed advantage relative to other techniques. In this disclosure, we propose a rapid 3D reconstruction method using one-shot special structured light. It works by projecting a static two-dimensional, eight-color DeBruijn spatial grid pattern onto the scene, analyzing the deformation of the observed light pattern with respect to the projected one, and identifying their correspondence. Several local optimization strategies are used to offer a confident solution, including special vote majority for color detection and correction, and DeBruijn based Hamming distance minimization to improve intersection neighborhood information. The effectiveness of the proposed method is experimentally verified through 3D reconstruction of a complicated bust.

Detailed Description

This disclosure describes a marker-less AR system which employs structured light (SL). In particular, the system accomplishes range-finding without the a priori or comparative data set of the scene, but instead, uses a known projection. By doing this, range-finding can be accomplished for any unknown environment requiring one instance of data regarding the scene. The tracking method implemented still conducts environment-to-environment comparison, but requires only three tracked points as opposed to as many as eight corresponding points in motion-analysis based AR.

This disclosure also presents a fast 3D reconstruction method based on one-shot spatially multiplexed structured light. In particular, a DeBruijn sequence (T. van Aardenne-Ehrenfest and N. de Bruijn, "Circuits and trees in oriented linear graphs," in Classic papers in combinatorics. Springer, 1987, pp. 149-163) is used for encoding a color grid. To improve the resolution and field of view (FOV) under larger dynamic scenes, we extend fast the 3D reconstruction method to use eight colors instead of six. After adding two more colors, the resolution is increased from 841 points to 4356 points. But this also brings up a problem for color detection. To compensate that, we use a Hamming distance based method to improve the robustness. With only a single shot of a color grid, the depth information of a target object is extracted in real time. Given our focus on mobile applications with dynamic scenes, some detail, such as sub-pixel accuracy, is a less significant concern. Instead, with the aim of achieving a balance of efficiency and accuracy, we strive to improve the speed of the proposed method while a decrease in accuracy can be tolerated by the system. In our experiments, the entire process from projecting a pattern to triangulating for mesh reconstruction takes less than one second.

Three-Dimensional Reconstruction Method

System Architecture

Figure 6:
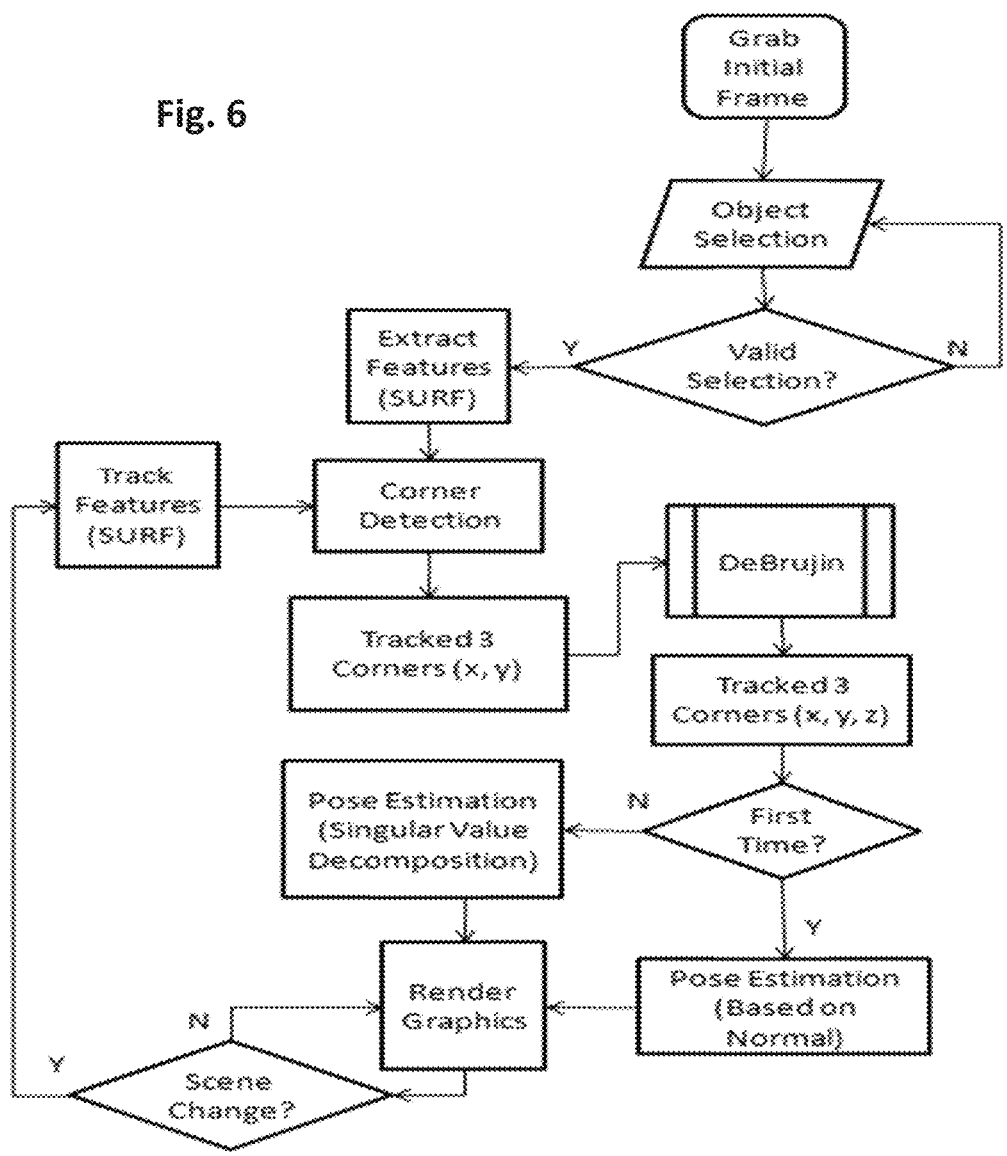
FIG. 6 is a flow chart depicting the system architecture of the 3D reconstruction method described herein.

The general system architecture of the 3D reconstruction method is described in this section. The proposed method is based on a three-stage process of image tracking and structured light decoding. As shown in FIG. 6, the user first selects an object of interest in real time. This object is analyzed to extract the invariant features using a combination of SURF (H. Bay, T. Tuytelaars, and L. Van Gool, "SURF: Speeded up robust features," in European Conference on Computer Vision, vol. 1, pp. 404-417, 2006) features along with the Shi-Tomasi corner detection algorithm (J. Shi and C. Tomasi, "Good features to track," Proceedings of the IEEE Conference on Computer Vision and Pattern Recognition, pp. 593-600, 1994). These corners are estimated in future video frames using optical flow estimation. The outputs of this first stage are the pixel locations where the largest three features, which are the three most prominent corners, are found in the user selected region.

The second stage involves calculating the pose of the object in the real world. A DeBruijn encoded light approach is adapted to require 3 projections for accuracy (P. Griffin, L. Narasimhan, and S. Yee, "Generation of uniquely encoded light patterns for range data acquisition," Pattern Recognition, vol. 25, no. 6, pp. 609-616; J. Pages, J. Salvi, and C. Matabosch, "Robust segmentation and decoding of a grid pattern for structured light," Proc. 1St Iberian Conf. on Pattern Recognition and Image Analysis, pp. 689-697, 2003). The 2D points initially tracked from the first stage are transformed into 3D locations from the SL output to be used as a rigid body reference throughout the entire application.

The third stage involves rendering virtual content onto the video sequence, which will not be a focus of this disclosure. Brief explanations of these individual stages follow.

Feature Tracking Stage

In the first stage, the user selects an object of interest on the initially captured video frame. This is implemented using the built-in functionality of event call backs in OpenCV and allows the application to have a point of reference for the remainder of execution. This step is not necessary but it is very helpful to include, as this step provides an easy basis for determining 'where' the AR information should be placed.

A benefit of marker-based and current marker-less-based systems is the presence of the definitive object of interest in the scene. Some SFM approaches also share this issue and require the user to manually select three feature points on a captured video sequence to create a plane for AR (e.g., Andrew J. Davison, Ian D. Reid, Nicholas D. Molton, and Olivier Stasse, "MonoSLAM: Real-time single camera SLAM," IEEE Transactions on Pattern Analysis and Machine Intelligence, vol. 26, no. 6, June 2007). The selected region is then analyzed using SURF to track the region along with the Shi-Tomasi corner detection algorithm to recover the most prominent three corners in the region.

In attempting these tracking methods, we found SURF to be successful at tracking a more 'global' region, which serves as the input to Shi-Tomasi corner detection. We found that Shi-Tomasi was more successful at selecting specific point matches between frames on a more 'local-scale' with the given region from SURF. The outputs of this first stage are the pixel locations where the tracked three points were matched in the user selected region. These extracted corners of the image are then tracked between successive video frames using the iterative Lucas-Kanade optical flow method in OpenCV.

DeBruijn Structured Light Stage

The second stage involves calculating the pose of the camera with respect to the real world, where a DeBruijn encoding approach has been adapted (P. Griffin, L. Narasimhan, and S. Yee, "Generation of uniquely endocded light patterns for range data acquisition," Pattern Recognition, vol. 25, no. 6, pp. 609-616; J. Pages, J. Salvi, and C. Matabosch, "Robust segmentation and decoding of a grid pattern for structured light," Proc. 1St Iberian Conf. on Pattern Recognition and Image Analysis, pp. 689-697, 2003).

This stage can be broken up into four general processes. The first process retrieves intersections of the projected DeBruijn grid from the captured image. Traversing through these found intersections is then conducted to identify neighboring nodes in each of the North-East-South-West directions. The third process involves determining the unique code for each intersection based on its color and the neighboring colors in order to decode the captured image. The final stage is the actual triangulation, which finds correspondences between the projected and captured image.

Graphics Rendering Stage

Triangles of points (i.e., trios of 2D image points) initially taken from the first stage are transformed into 3D locations from the DeBruijn output and then formed to make a plane to be used as reference throughout the entire application. The first time through the pipeline, a typical homogeneous matrix can be calculated for this plane, except for an arbitrary rotation around the surface normal. Otherwise, it is calculated using Singular Value Decomposition (SVD) technique (also provided via the OpenCV software package, for example) between the current 3D triangle and the previous 3D triangle found. This yields a more specific (environment-to-environment comparative) rotation and scale matrix between the two triangles. The graphical content is then embedded in the video sequence. Given that the algorithms needed in Stages 1 and 3 are readily available in the OpenCV software package and similar publicly-available algorithms, their details are excluded from this disclosure.

Structured Light Implementation

This section of the disclosure focuses on the SL stage of the 3D reconstruction method.

The SL method is spatially multiplexed, which means that the information needed to determine matching correspondence pairs (environment-to-projection comparisons) is provided by the spatial relationship of items in the captured image and the spatial relationship of items in the known projection image. A grid of different colored stripes is projected onto the scene. Horizontal and vertical stripes compose the grid in the active image, where intersections provide points of interest to identify in the passive image. Concatenation of some intersection information produces six-digit codes that exhibit uniqueness for both the horizontal and vertical processions separately.

Employing the concept of DeBruijn encoding allows for use of a limited number of symbols (here, colors), due to that fact that any given entry in a DeBruijn sequence is unique based on its own symbol and the symbols of its neighbors. Here, three symbols (colors) are utilized for the horizontal and vertical processions separately, totaling six colors required in the projected image. For example, horizontally, a stripe may be red, green, or blue; while vertically, a stripe may be magenta, yellow, or cyan. These colors are the inherent symbols tied to the stripe.

Considering the symbols of all the horizontal stripes from top to bottom, any three-symbol-length sequence of adjacent stripe colors is uniquely encoded by these symbols; the same can be said for the vertical direction. This fact ensures that an intersection of a unique three-color horizontal sequence overlain atop a unique three-color vertical sequence will only occur once in the produced grid. Resolution is limited by the uniqueness constraint, but can be increased, for example by adding more colors in each direction.

The SL methodology consists of four major components: extracting intersections of a grid, traversal of the intersections, decoding the intersection, and triangulation. While the procession of these processing stages has served useful, it is also worth noting that there is likely flexibility here, as certain information from one stage might also be useful for making decisions in a previous stage. There are many more computationally expensive algorithms to retrace decisions and attempt to optimize the result based on dynamic programming or "divide and conquer" techniques where action or inaction is ranked. The procession disclosed here attempts to solve the problem with less risk of causing high level errors by relying on low level image processing techniques and isolating relationships to local levels.

Extracting Intersections

The main purpose of the first stage in the DeBruijn process involves projecting, capturing, and processing images in order to retrieve the stripe substrate material overlain on the real world scene. This recovered stripe substrate from the captured image will be referred to as the pass detected mask in this disclosure.

The pass detected mask is used as mask for any image processing operations in efforts to minimize computational time. One existing method involves using the Sobel operator to take the derivative in both the x and y directions (J. Pages, J. Salvi, and C. Matabosch, "Robust segmentation and decoding of a grid pattern for structured light," Proc. 1St Iberian Conf. on Pattern Recognition and Image Analysis, pp. 689-697, 2003). This method produces inconsistent results when considering pass detected masks extracted from consecutive video frames. Another method simply checks the RGB value of every pixel and sees if the value is greater than a specified threshold, but this produces errors when considering varying scene colors. For instance, on a very colorful object, a pixel may falsely be identified as a stripe, while on a black surface, the opposite would occur due to the low illumination captured from the area.

Figure 7:
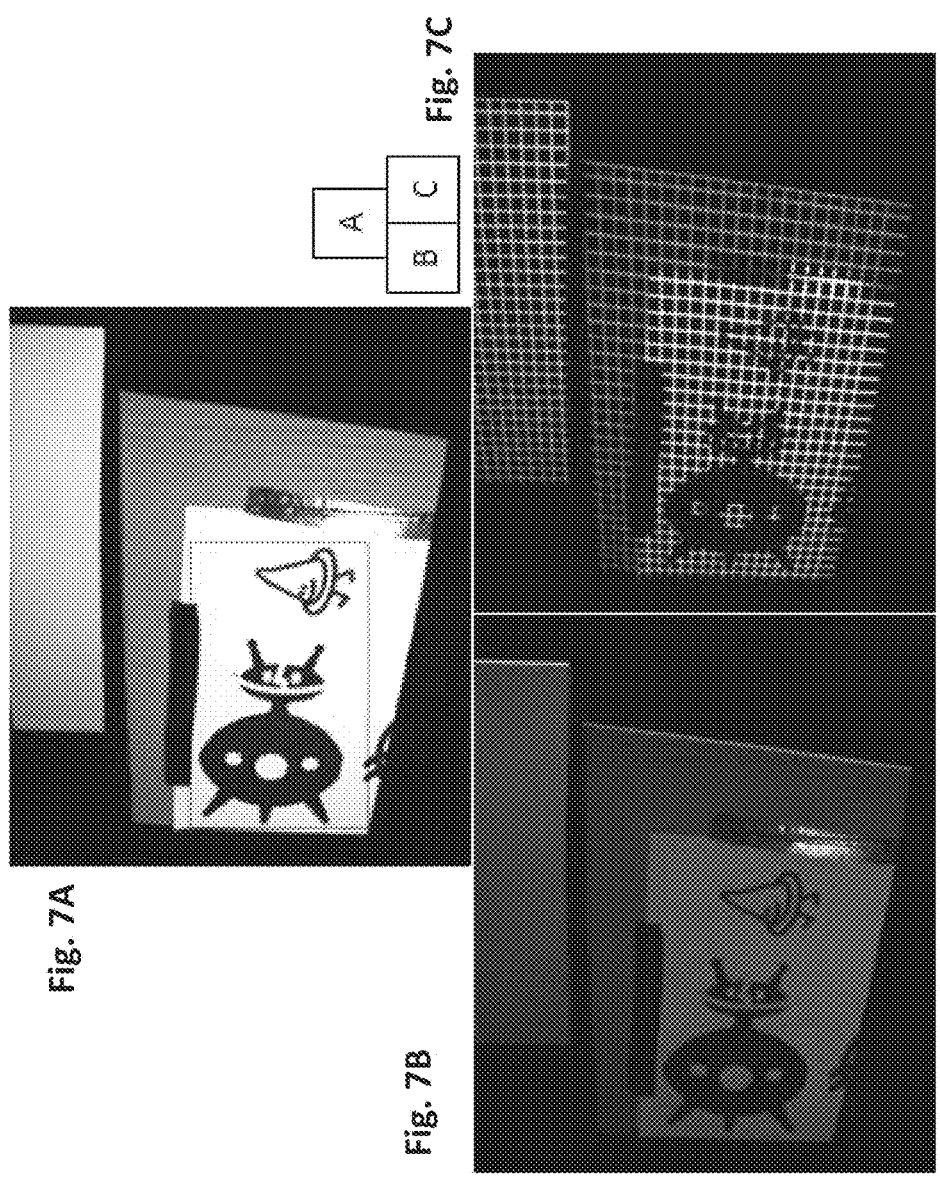
FIG. 7, consisting of FIGS. 7A, 7B, and 7C is a trio of images which depict a user selected region of interest (ROI.

To account for these issues, another projection is introduced in order to extract the grid information from the real world scene. This grid has the same dimensions and structure as the DeBruijn grid to be projected but only consists of two colors, black and white. The white represents the stripe substrate and the black represents all of the unwanted information in-between. Prior to projecting this highly illuminated grid, a gray flood lit image is projected on the scene and captured to be used as reference. The idea is that in the captured black and white grid image an (x, y) pixel in the "stripe" will have a greater intensity value than the same (x, y) pixel in the flood lit image. This approach has proven to work consistently over multiple consecutive frames and has also been proven to work more robustly on various colored/illuminated scenes; with high improvements specifically on the color black. Once this difference comparison is made for every pixel, the output is a pass detected mask to be used which contains a 1 anywhere a stripe is thought to be in the real world scene and a 0 otherwise. The described images and projections are depicted in FIG. 7.

Figure 8:
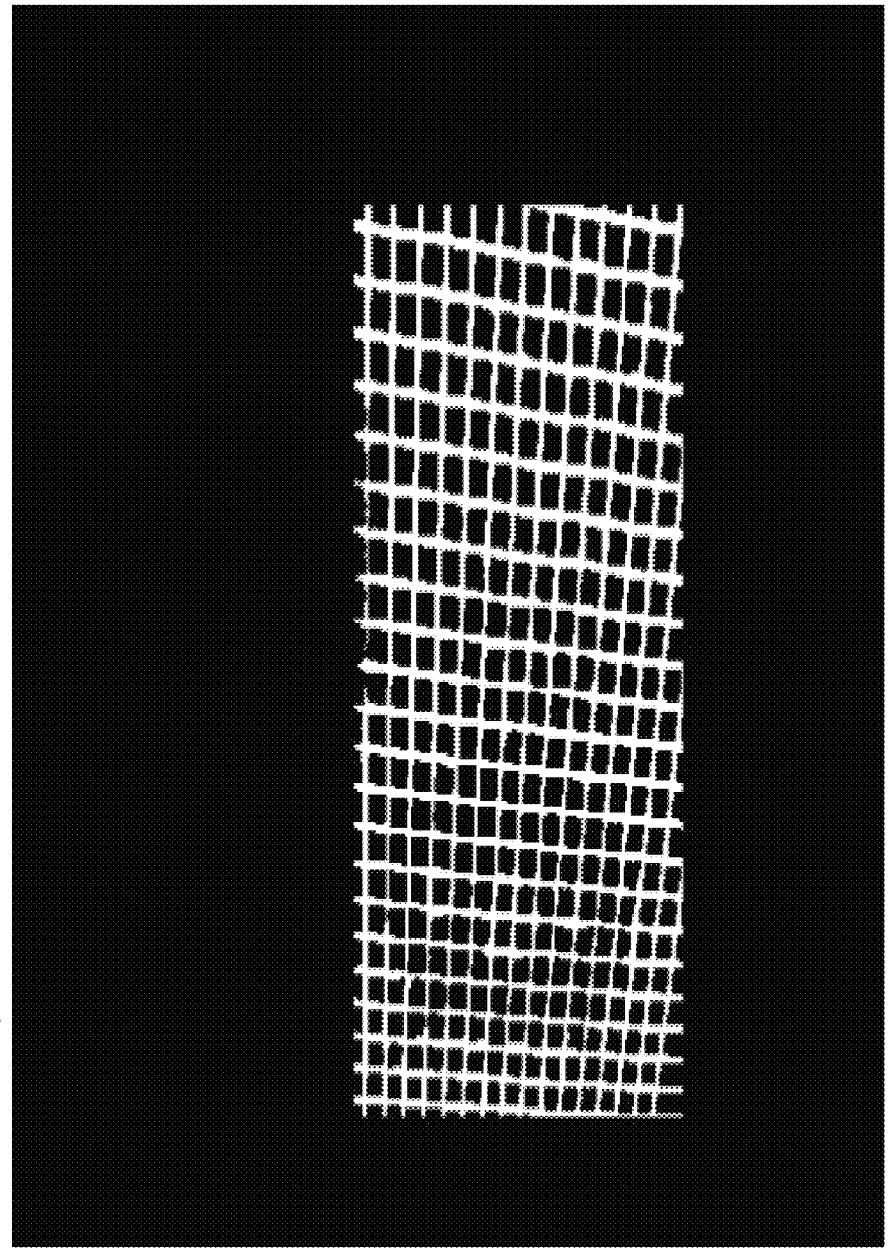
FIG. 8 is a diagram which illustrates an extracted pass detected mask grid in a region of interest.

From doing strictly the difference comparison between FIGS. 7B and 7C, the resulting pass detected mask is extracted in the user defined region from FIG. 7A. To validate the results of the method, see the alien figure in FIG. 7C. The color of the object is so dark that the projected grid is barely recognized by the camera. Employing this comparison method allows the program to determine where stripe substrate material is situated on the scene. We found that some minor discontinuities get created inside of the substrate material, which causes errors later down the system architecture. In order to account for these preemptively, standard morphological operations 'erode' and 'dilate' are utilized on the resulting pass detection. FIG. 8 demonstrates the extracted pass detect grid after the morphological operations were applied.

Figure 9:
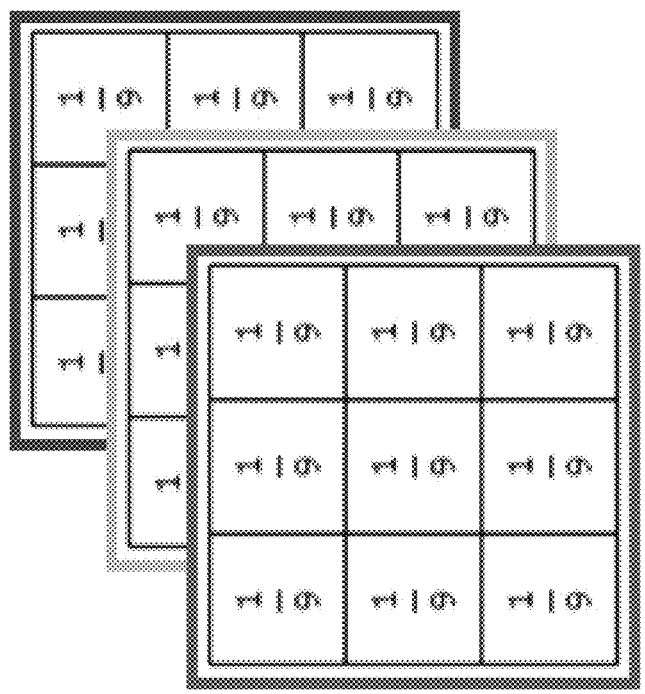
FIG. 9 is a diagram which a 3×3 moving average window in each color channel.

These pass detect lines are used to analyze and process the captured image with the actual DeBruijn color grid in order to better register the information. Coloration problems sometimes involved, for example, a magenta stripe in the image to be composed of very red and very blue pixels inter-mixed. To account for this, a low pass filter is employed to remove this high frequency noise from the image. A simple 3×3 moving average window characterized by FIG. 9 and formula (1).

$$I_{MA}(i,j)[v] = \frac{1}{9} \sum_{m=i-1}^{i+1} \sum_{n=j-1}^{j+1} I(m,n)[v] \quad (1)$$

where $I_{MA}$ is the moving average image result, I is the initial captured image, and v is an element of the three color channels {R, G, B}. The true goal of this step is to help produce a uniform color between pixels that are contained within the same stripe.

A general color cone model (K. Plataniotis and A. Venetsanopoulos; "Color Image Processing and Applications"; Springer-Verlag, 18 Feb. 2010) can be adopted to help identify stripe color; the individual Red, Green, and Blue components are converted into a Hue, Saturation, Intensity system in which the value of Hue determines the color of a pixel and ultimately of a stripe. Next, the actual intersections between the horizontal and vertical stripes are extracted. These intersections are later used, along with the defined color from the previous process, for triangulation and are referred to as the intersection mask.

Some methods alter the DeBruijn grid to contain specific color information for intersections or use color combinations to define intersections (J. Salvi, J. Batlle, E. Mouaddib; "A robust-coded pattern projection for dynamic 3D scene measurement"; Pattern Recognition Letters Vol. 19, pp. 1055-1065; 29 May 1998). The idea used in this system architecture is to instead find intersections based on the structure of the grid rather than the extracted colors. The pass detected grid is first thinned using a slightly modified version of the Hilditch algorithm (M. Yin and S. Narita, "Speedup method for real-time thinning algorithm," in Digital Image Computing Techniques and Applications, January 2002). The algorithm acts based on the number of total rises, (i.e. changes in value from 0 to 1 or 1 to 0) and the total neighbors with a value of one or 'high'. The equations for the number of neighbors with a value of one ('high neighbors', HN) and number of rises ($R_i$) for a given pixel from the moving average image result ($I_{MA}$) are below.

$$HN(i,j) = \sum_{m=j-1}^{j+1} I_{MA}(i-1,m) + \quad (2)$$

$$\sum_{n=j-1}^{j+1} I_{MA}(i+1,n) + I_{MA}(i,j-1) + I_{MA}(i,j+1)$$

$$R_1 = \sum_{m=j-1}^{j} |I_{MA}(i-1,m+1) - I_{MA}(i-1,m)| \quad (3)$$

$$R_2 = \sum_{n=j}^{j+1} |I_{MA}(i+1,n) - I_{MA}(i+1,n-1)| \quad (4)$$

$$R_3 = \sum_{o=i-1}^{i} |I_{MA}(o,j+1) - I_{MA}(o+1,j+1)| \quad (5)$$

$$R_1 = \sum_{p=1}^{i+1} |I_{MA}(p-1,j-1) - I_{MA}(p,j-1)| \quad (6)$$

$$Ri(i,j) = R_1 + R_2 + R_3 + R_4 \quad (7)$$

The result from this step is a binary-valued grid of stripes, the stripes being at most one pixel in width. This grid is referred to in this disclosure as the skeleton mask.

Figure 10:
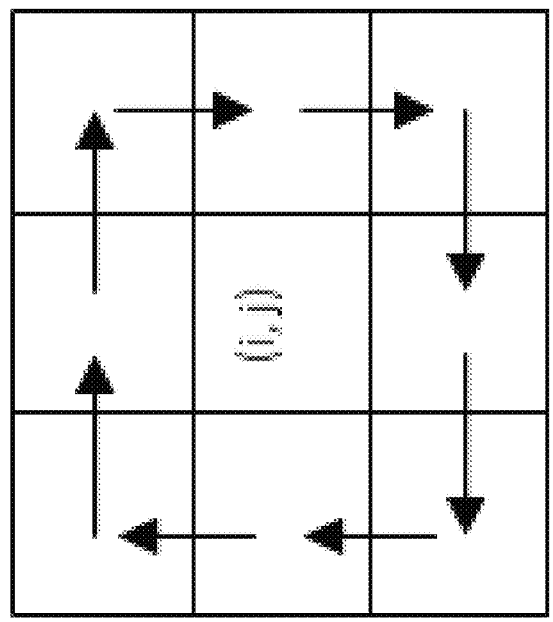
FIG. 10 is a diagram which illustrates moving window analysis for intersection extraction at (i, j).
Figures 11A, 11B:
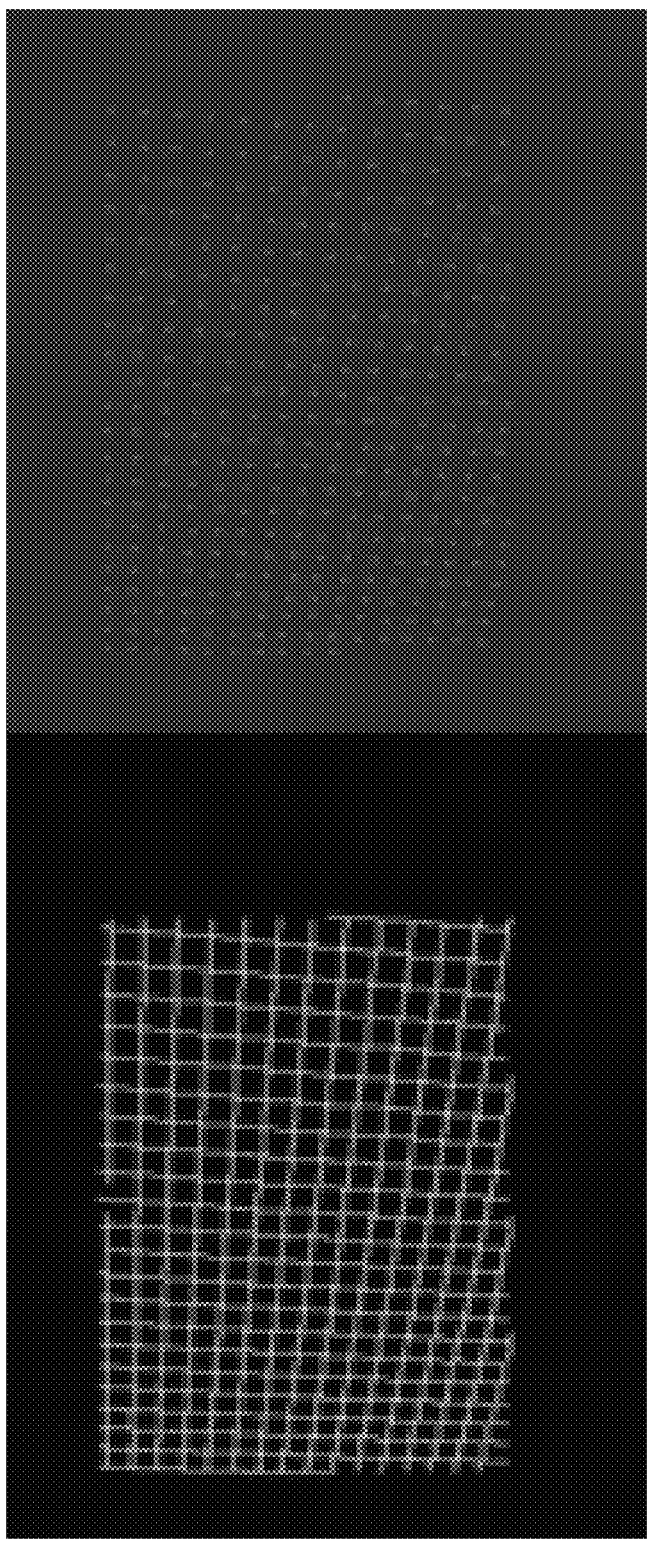
FIG. 11, consisting of FIGS. 11A and 11B is a skeleton mask (FIG. 11A) and intersection mask (FIG. 11B). Contrast of the image was altered to accent intersections.

The intersections are then found by running a moving 3×3 window throughout the skeleton mask and finding connected components in three or more directions. This window checks neighboring pixels in a clockwise direction (for example) to keep track of total rises, i.e. changes in value from 0 to 1, and total high neighbors; this is depicted in FIG. 10. Results of thinning and intersection detection are shown in FIG. 11.

Traversal

The traversal method attempts to find the paths of connectivity between consecutive intersections by 'traversing' the image from intersection to intersection. To properly map the passive and active images for correspondence (environment-to-projection), neighboring intersection relationships need to be found in the passive image. In this context, a neighbor is no longer the immediately adjacent pixel. Most intersections, for example, will have a North Neighbor, which is a different intersection formed on the same vertical stripe, but in combination with an adjacent horizontal stripe in the northern direction in the active image. The skeleton mask and intersection mask are used in this process. The algorithm loops through every found intersection from the intersection mask and uses the skeleton mask to traverse through stripe substrate material.

Figure 12:
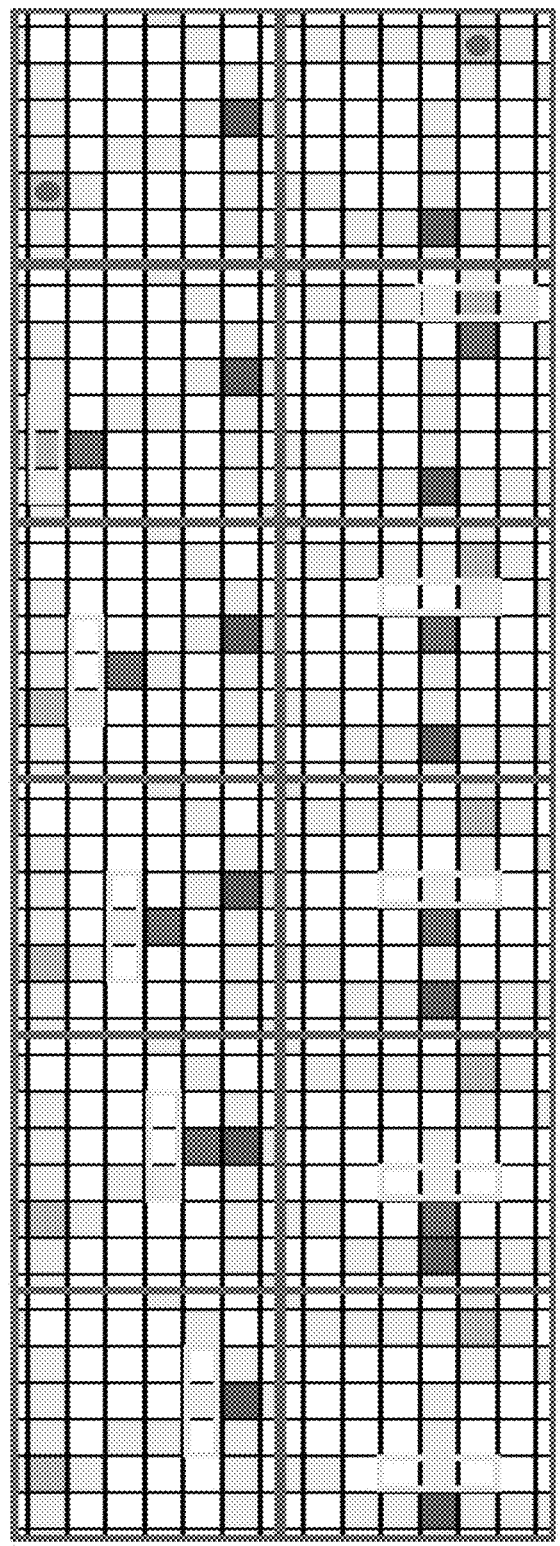
FIG. 12 is a portrayal of Northern traversal in the top row of images and Eastern traversal in the bottom row. The red pixel is the starting intersection location, the green pixel is another intersection, and the blue pixel is the previously traversed pixel on the skeleton. The light gray boxes represent identified substrate material in the skeleton mask. The yellow box is the moving 3×1 or 1×3 window.

The loop works by temporarily selecting an intersection, to be known as the observed intersection for the remainder of this iteration. In this iteration, the algorithm attempts to find a northern, southern, eastern, and western connected intersection for the observed intersection. When the iteration starts at an observed intersection, it will first search for a northern neighbor by searching a 3×1 window, placed such that the center of this window is one row north of the observed intersection and in the same column. A pixel in the skeleton mask is sought after, similar to the method employed in (J. Pages, J. Salvi, and C. Matabosch, "Robust segmentation and decoding of a grid pattern for structured light," Proc. 1St Iberian Conf. on Pattern Recognition and Image Analysis, pp. 689-697, 2003). The first pixel skeleton mask pixel, or path pixel, located in this 3×1 window is chosen and search will continue from here using a new location for the 3×1 window. If instead an intersection neighbor is found in the 3×1 window (using the intersection mask) in any of the three pixel locations, then that intersection is chosen as the observed intersection's northern neighbor. A visual example is shown in FIG. 12.

While the traversal is happening, the 3×1 window position is iteratively updated to search north of the most recently chosen path pixel, until either an intersection is found in this manner, or no intersection is found in an allotted maximum distance from the original observed intersection. In finding the southern neighbor, the same process is used except that the 3×1 window is placed one row south, rather than north, of the observed intersection or traversing pixel. The same process is completed horizontally using a 1×3 window to find the nearest horizontal intersection in the east and west direction (primarily changing column instead of row). In this manner, the North, South, East, and West neighbor can be found for any observed intersection. This is repeated for each intersection as the observed intersection once.

Once traversal is fully completed (as many neighbors are found as can be using this method), the neighboring information is combined with the color extraction techniques from the first stage in the structured light algorithm to actually decode the intersections.

Decoding Intersections

Figure 13:
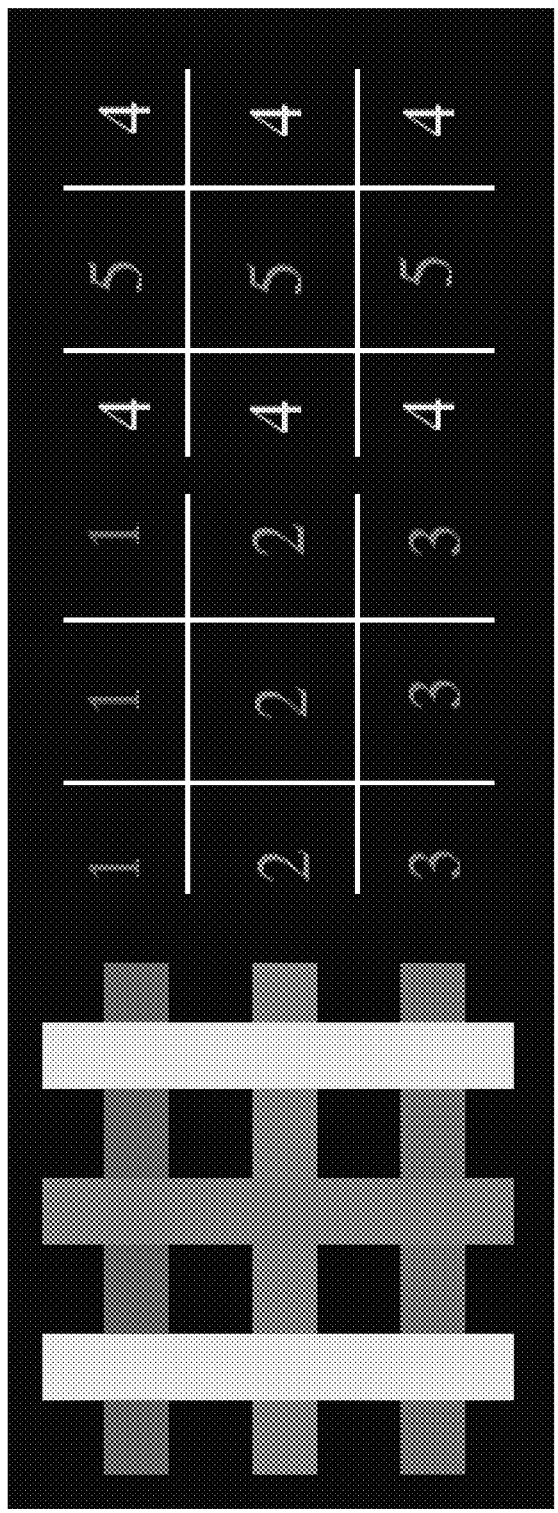
FIG. 13 is an example of decoding for a generic intersection

This stage is to determine the identity of every intersection found in the intersection grid by utilizing the previously found neighboring intersections. The identity is known specifically as an encoded six-digit sequence. This six-digit sequence may be viewed as the combination of two three-digit sequences, one for a concerned vertical stripe and the other for horizontal, where the intersection in question is the center of both sequences. A numerical value is given to each color in the grid based on a lookup table with the range of the total number of used colors. An example intersection analysis can be seen in FIG. 13.

The six digit sequence is created by first observing North, middle, and South horizontal stripe color. The last three digits of the code word are found by observing the West, middle, and East vertical stripe color. If a code word were made for FIG. 13, it would be 123454~RGBYMY, for example.

The colors of the intersection and neighboring intersections are matched from the intersection grid along with the color identification step from the first stage in the structured light algorithm. Code words are only created for intersections for which 4 neighbors are found.

Triangulation

The final stage in the structured light algorithm is triangulation, in which extraction of 3D data takes place. When considering ideal triangulation between the projector and the camera, the vectors that each device projects outward would ideally intersect in 3D space. This high level of accuracy is practically impossible due to the behavior of pixel operations, stripe thinning, pass detection, and/or noise. Instead of implementing strict triangulation, the closest approach of two lines method is used to obtain a point in 3D space. In this method, the 3D point need not lie on either vector, but rather it is a 3D point that lies on the shortest finite-length line connecting the vectors. The method begins by recognizing the two vectors, a and b, as vectors which each extend outward from their starting points. These vectors are constructed knowing the starting point Q (x, y, and z locations of lenses). Any arbitrary point on one of these vectors can be described as P[w], where the position of the arbitrary point changes based on the weighting multiplied by the direction of the vector, contained in x, y, and z basis directions.

$$P_a[w_a]=Q_a+w_a x_a+w_a y_a+w_a z_a \qquad (8)$$

$$P_b[w_b]=Q_b+w_b x_b+w_b y_b+w_b z_b \qquad (9)$$

where $Q_a$ and $Q_b$ are the starting points of the camera and projector, respectively. The camera is considered to be at (0,0,0). The $w_a$ and $w_b$ terms are weight terms for vector a and b respectively; an increase in a weight means the point of interest P is farther from the starting point Q, in the direction granted by x, y, and z basis directions.

Next, the method determines the shortest line, v, which connects vectors a and b. Line v will satisfy a perpendicular set of equations with respect to vector a and vector b. Equation (10) shows the definition of a and b, shorthand for explicitly showing each of the basis directions of the respective line. Equation (11) shows that v will be perpendicular to a and b simultaneously.

$$a=[x_a+y_a+z_a]; \ b=[x_b+y_b+z_b] \qquad (10)$$

$$v*a=0_i**\circ v*b=0_j** \qquad (11)$$

(**The dot product of two perpendicular vectors is zero)

In equation (12), we again see line v and define it as the finite-length line connecting the two vectors a and b, where v is again perpendicular to both a and b as in equation (11). The vector v which connects these two lines and is perpendicular to them simultaneously is guaranteed to be our vector of closest approach. Finally, we substitute (12) into both of the equations which constitute (11), producing equations (13) and (14).

$$v=P_a[0]-P_b[0]+w_a*a-w_b*b \qquad (12)$$

$$aP_a[0]-aP_b[0]+w_a(a*a)-w_b(a*b)=0 \qquad (13)$$

$$bP_a[0]-bP_b[0]+w_a(a*b)-w_b(b*b)=0 \qquad (14)$$

There are two equations and two unknowns in (13) and (14), and the weights are solved simultaneously. With these weights, the two positions that form the closest-approach are known by (8) and (9). The average of the two points $P_a[w_a]$ and $P_b[w_b]$ is taken as the triangulation of the intersection.

Implementation and Results

Results of implementing the techniques discussed above are disclosed in this section.

Figure 14:
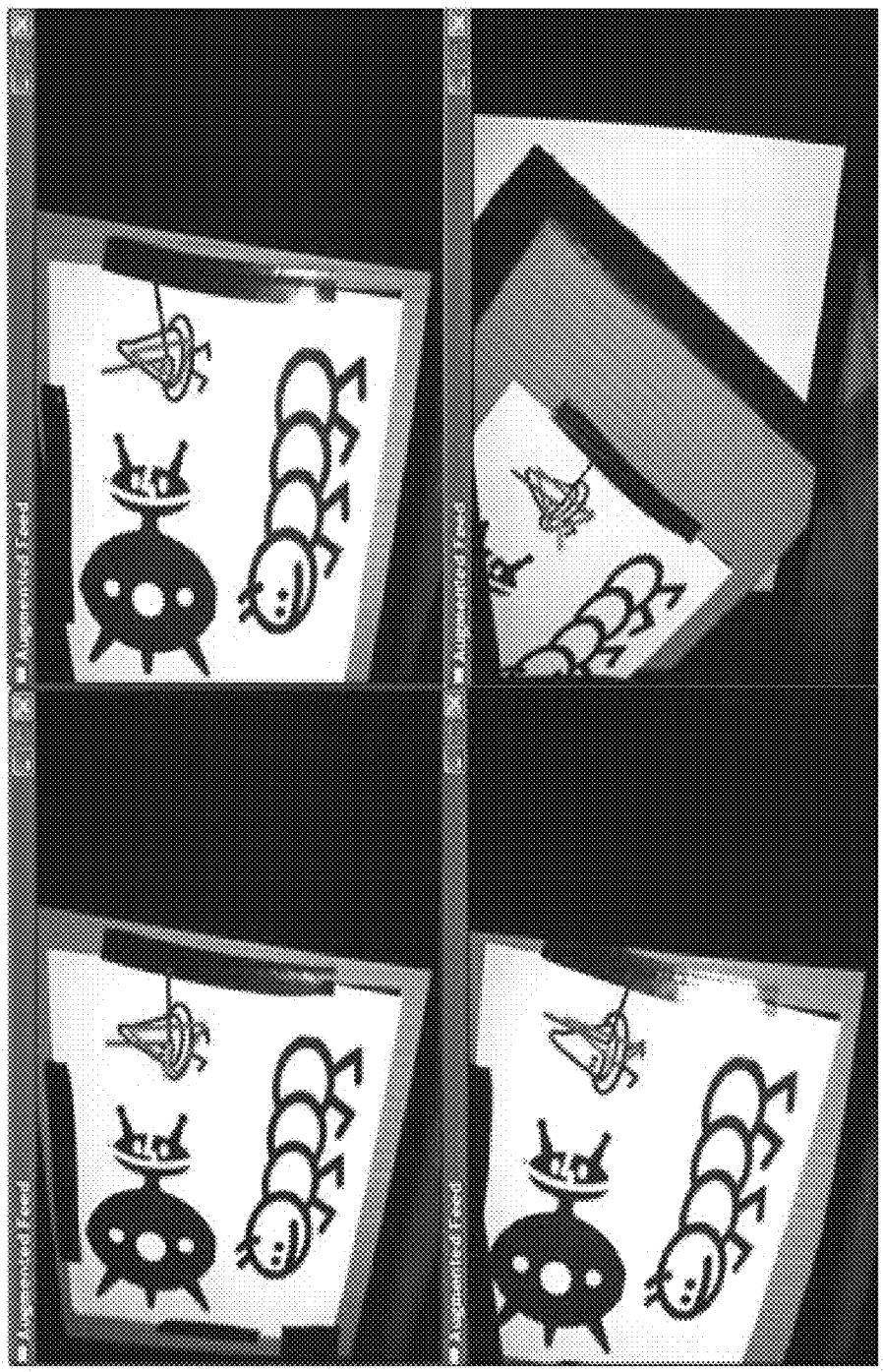
FIG. 14, consisting of FIGS. 14A, 14B, 14C, and 14D, is a collage of video frames for cone object rendering 3D pose (red, green, blue) and tracked triangle (magenta).
Figure 15:
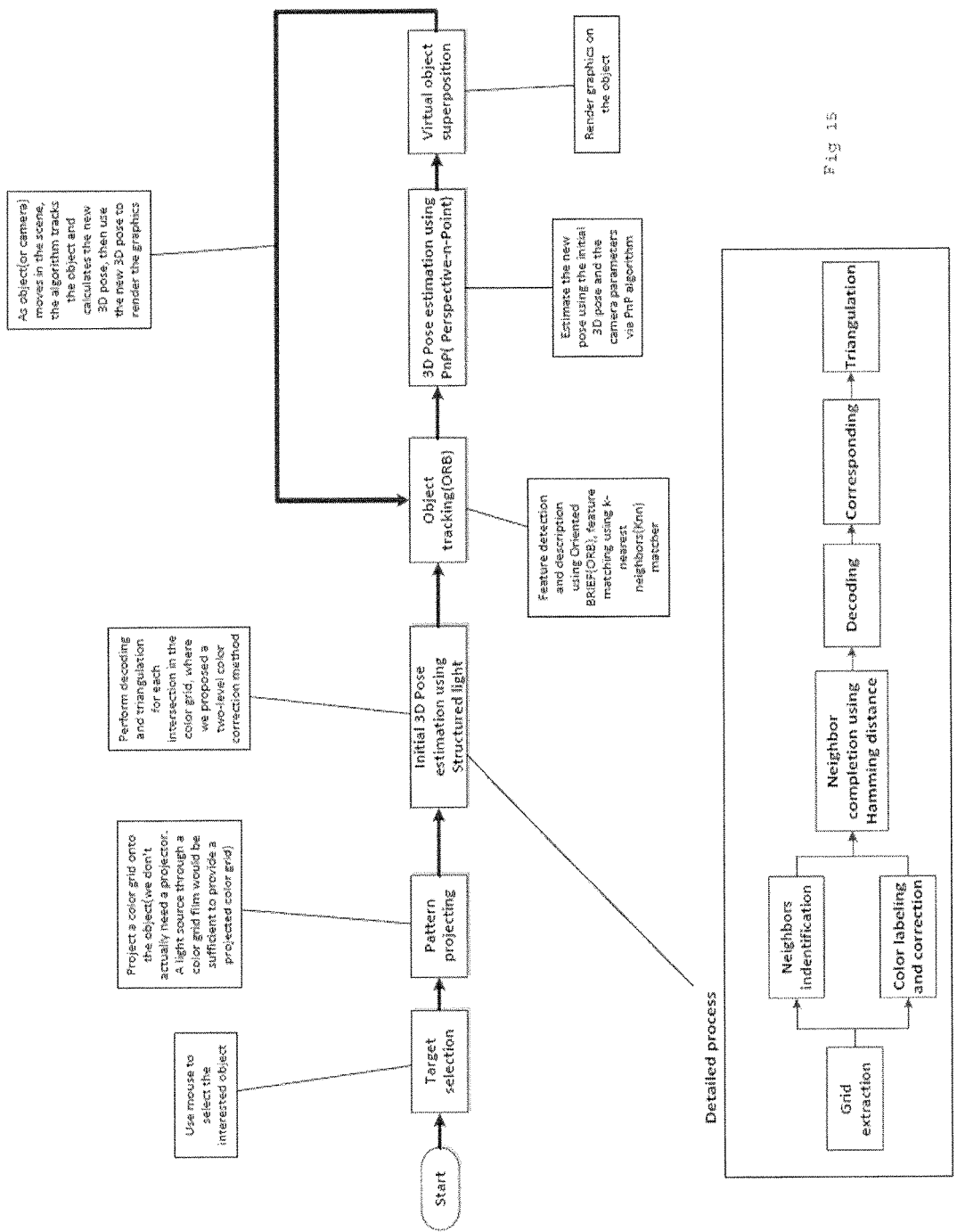
FIG. 15 is a flow chart depicting the system architecture of the fast 3D reconstruction method which employs structured light, described herein.

It is believed that the most important result from an AR tracking/registration technique is the camera pose with respect to the real world object. With this belief in mind, validation of the system was shown on an unknown object with multiple objects of interest present by imposing the calculated coordinate system onto the object. FIG. 14 shows some results by imposing a set of 3 axes, for the x, y, and z axes of the surface.

At the start up of the program, an initial frame was grabbed (i.e., captured) and the user drew a square region around the cone object to specify the object of interest. Once this was completed, the further outputs were the successive augmented video frames which in this case show the calculated pose of the chosen object. In order to get a sense of how tracking works in the algorithm, the automatically selected triangle from the Shi-Tomasi corner detection algorithm is also drawn on each video frame. As it can be seen, the estimated pose is generally in the middle of the tracked triangular region.

Conclusions

This disclosure describes a marker-less augmented reality approach that uses spatially multiplexed structured light. The application of SL successfully overcomes the deficiency of existing marker and marker-less AR methods that either utilize fiducial markers, prior information about the real world scene, or environment-environment comparison, thereby making the proposed methodology more suitable for AR in an un-prepared and un-known environment.

Marker-Less Augmented Reality System Involving Structured Light

Overview Of The Approach

The disclosed structured-light method consists of a color camera and a projector, both of which are calibrated with respect to a world coordinate system and have their intrinsic and extrinsic parameters known. When the projector projects a color-coded light pattern onto a 3D object, the camera captures its image. The 3D information of the object is then obtained by analyzing the deformation of the observed light pattern with respect to the projected one and identifying their correspondence.

Matching pairs of light points and their images present several challenges. First, with the aim to project only one light pattern for real-time applications, there is a tradeoff between reliability and accuracy to select proper color stripes in terms of the number of colors, length of code word, and dimensions. In the method disclosed herein, a two-dimensional eight-color DeBruijn spacial grid is used to offer a confident solution.

The more colors that are used, the higher density and resolution are obtained. However, the more colors that are used, the greater the chance of color misdetection. To overcome this drawback, the method disclosed herein uses a two-level color label correction process. The grid pattern preserves spatial neighborhood information for all captured grid points.

For instance, if two points are connected vertically/horizontally on the captured image, their correspondences must follow certain topological constraints (e.g., the same vertical/horizontal color). Those constraints are then used to correct color detection errors as described herein. When dealing with more complex scenes that involve shadows, occlusion, and discontinuities, observed geometric constraints can be misleading (A. Ulusoy, F. Calakli, and G. Taubin, "Robust one-shot 3d scanning using loopy belief propagation," in Computer Vision and Pattern Recognition Workshops (CVPRW), 2010 IEEE Computer Society Conference on, June 2010, pp. 15-22). Thus, a DeBrujin based Hamming distance minimization method is established for further correction.

3D Reconstruction Processes

As illustrated in FIG. 1, the reconstruction process starts with projecting, capturing, and image processing in order to retrieve the grid overlain on the object. The recovered stripe substrate forms a 2D intersection network to solve the correspondence problem. Without loss of generality, the structured light codification is first presented in the following section, followed by a brief explanation of the image processing technique used to obtain a 2D colored intersection network. The detailed methods to remedy color detection errors and incomplete neighborhood information due to occlusion are then described.

A. Color-Coded Structured Light

Our projected grid pattern is composed of vertical and horizontal colored slits representing a DeBruijn sequence. A DeBruijin sequence of order n over an alphabet of k color symbols is a cyclic sequence of length $k^n$ with a so-called window property that each subsequence of length n appears exactly once (T. van Aardenne-Ehrenfest and N. de Bruijn, "Circuits and trees in oriented linear graphs," in Classic papers in combinatorics. Springer, 1987, pp. 149-163).

When applying such a sequence to both vertical and horizontal stripes, it forms a m×m grid, where $m=k^n+2$ and a unique k-color horizontal sequence overlain atop a unique k-color vertical sequence only occurs once in the grid. Let C be a set of color primitives, $C=\{c | c|=1; 2; 3; \ldots; 8\}$, where the numbers represent different colors. Each crosspoint in the grid matrix, $v_i$, is an intersection of a vertical stripe and a horizontal stripe with its unique coordinate $(x_i; y_i) \in \Omega$, where $\Omega$ is the camera's image plane and colors $(c^h_i, c^v_i)$, where $c^h_i, c^v_i \in C$, representing the horizontal and vertical colors of $v_i$, respectively. The color-coded grid network can be interpreted as a undirected graph $$G=(V,E,P,\xi,\theta,\chi,\tau), \text{ where}$$

$V=\{v_1, v_2, \ldots v_{m \times m}\}$ represents grid intersections.

$e_{ij} \in E$ represents a link between two nodes i and j in the grid.

P is a vector of 2D coordinates of $v_1$ the camera's image place, $(x_j, y_j); (x_j, y_j) \in \Omega, l(P)$ where denotes the length of P.

$\xi: V \to C$ is the color labels associates with a node where $$\xi(v_i)=(c_i^h, c_j^h); \xi^h(v_i)=c_i^h, \xi^v(v_i)=c_i^v.$$

$\Theta: V \to \{\Theta(v_1), \Theta(v_2), \ldots \Theta(v_{m \times m})\}$, where
$\cup_j Nb_j(v_i); j \in \{north, south, west, east\}; Nb_j(v_i) \in V$ represents the neighbors of $v_1$ When the $j^{th}$ neighbor of $v_1$ does not exist, $Nb_j(v_i)$ is assigned a value of NULL.

$\chi: \Theta \to \{1,0\}$ is a decision function with a binary output.

Figure 2:
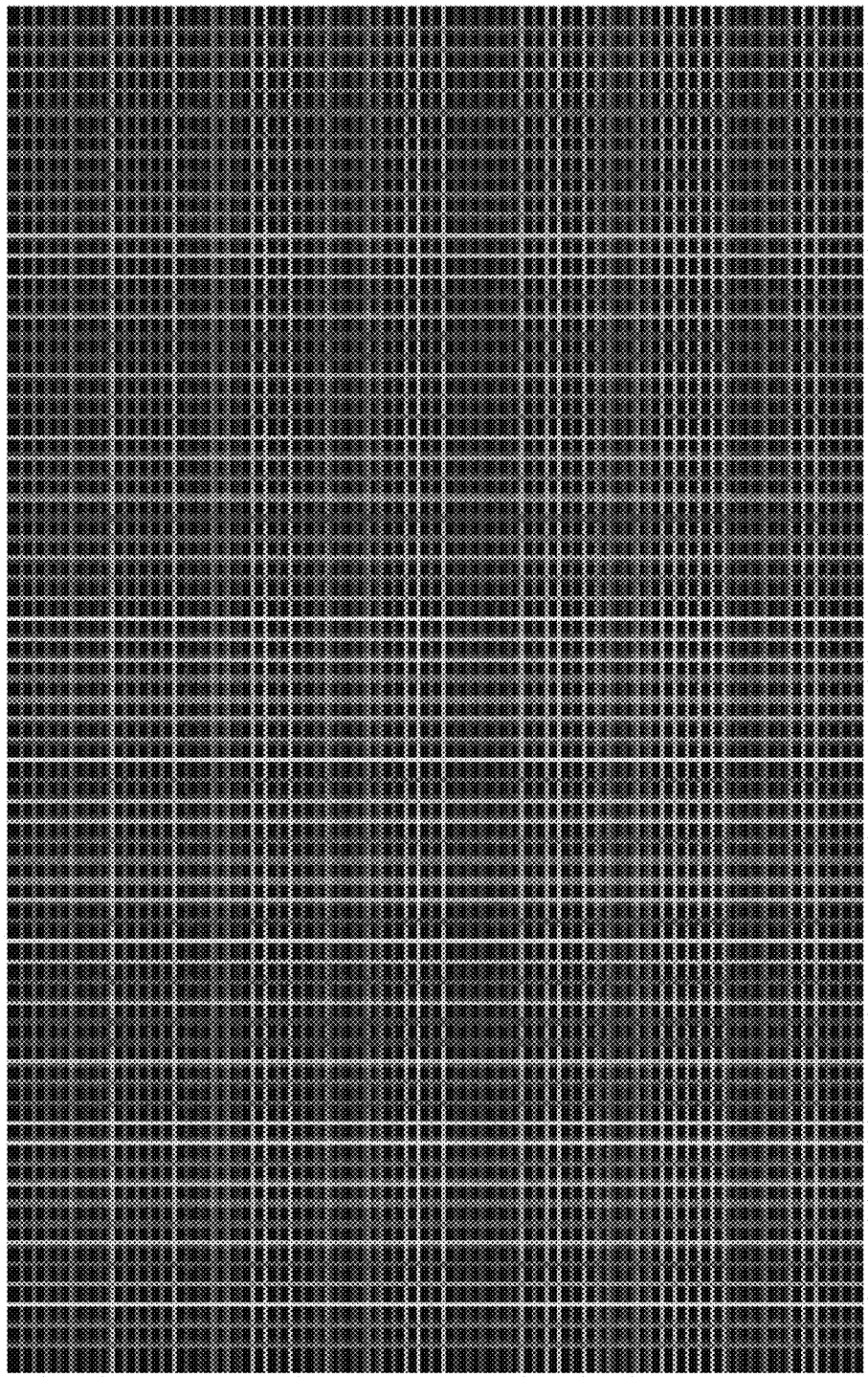
FIG. 2 is a color grid pattern used in the marker-less AR system described herein.

$\forall_j \in \{north, south, west, east\}$ $\exists Nb_j(v_i) \in \Theta(v_i) = \text{NULL} \to \chi(\Theta(v_i))0,$ else, $\chi(\Theta(v_i))=1$ $\tau: V \to P$ is a function for getting the 2D coordinates of $v_1$ where $\tau(v_j)=p_j$ In our implementation, C=1; 2; . . . 8, representing Red, Yellow, Lime, Green, Cyan, Blue, Purple and Magenta. The colors used for the horizontal stripes are Red, Lime, Cyan and Purple, while Yellow, Green, Blue and Magenta are used for vertical stripes. They are evenly distributed in HSV space for better color detection. FIG. 2 shows the resulting grid.

The total of eight colors are significant in improving the density and resolution in comparison to other earlier works (Y. Xu and D. G. Aliaga, "Modeling repetitive motions using structured light," Visualization and Computer Graphics, IEEE Transactions on, vol. 16, no. 4, pp. 676-689, 2010; S. Chen, Y. Li, and J. Zhang, "Realtime structured light vision with the principle of unique color codes," in Robotics and Automation, 2007 IEEE International Conference on. IEEE, 2007, pp. 429-434).

B. Image Processing for Grid Extraction

There are several image processing methods used in our implementation to retrieve the stripe substrate material overlain on the real world scene. First, an adaptive thresholding with a Gaussian kernel is used to correctly segment the projected and deformed grid. The idea is to check if the RGB value of every pixel is greater than a threshold which is the Gaussian average of a local intensity. Given that eight colors are used for vertical and horizontal stripes in our implementation, such a threshold is not fixed but rather adapts to the local intensity of a 9×9 neighborhood of the pixel. The Hilditch thinning algorithm (C. Hilditch, "Comparison of thinning algorithms on a parallel processor," Image and Vision Computing, vol. 1, no. 3, pp. 115-132, 1983) is then applied until the skeleton of the grid is obtained.

Based on the skeleton of the grid, intersections can then be located. The idea is to count the number of total rises, (i.e. changes in the pixel value from 0 to 1) and the total neighbors with a value of one or high within a 3×3 window centered at a pixel position of interest. The position is considered as an intersection of the grid as long as the total rises and the number of neighbors with a value of one are not less than 3 or the total rises is greater than 1 and the number of neighbors with a value of one is great than 4.

Due to the complexity of the scene (e.g., shadows, distortion, depth discontinuity, and occlusion, etc.), there exist spurious connections and holes, especially at the border of the background and the object. To this end, the watershed algorithm (L. Vincent and P. Soille, "Watersheds in digital spaces: an efficient algorithm based on immersion simulations," IEEE transactions on pattern analysis and machine intelligence, vol. 13, no. 6, pp. 583-598, 1991) is first used for the segmentation of the target object from the background, resulting in two grid networks.

The traversal algorithm used in our prior work (M. Torres, R. Jassel, and Y. Tang, "Augmented reality using spatially multiplexed structured light," in Mechatronics and Machine Vision in Practice (M2VIP), 2012 19th International Conference, November 2012, pp. 385-390) is then applied to the networks individually with the purpose of determining the northern ($Nb_{north}(v_i)$), southern ($Nb_{south}(v_i)$), eastern ($Nb_{east}(v_i)$) and western ($Nb_{west}(v_i)$) neighbors of each intersection $v_i$. The algorithm moves a 3×1 (for the north-south traversal) or 1×3 (for the west-east traversal) window along the direction it traverses to the most recently chosen path pixel, until either an intersection is found in this manner, or no intersection is found in an allotted maximum distance from the original observed intersection.

An intersection $v_i$ with four neighbors determined is considered a perfect intersection which will be used for triangulation. Due to the aforementioned challenges, not all the intersections have complete neighborhood information. To avoid of losing those intersections when decoding the codeword for triangulation, further process is needed.

C. Color Labeling and Correction

Each intersection in our color-coded grid is represented by its unique neighborhood information, particularly the colors of its neighbors. To determine the color of each intersection, the captured color gird is blurred with a 3×3 Gaussian filter with a mask of the skeleton grid described herein. The purified color grid is then converted from RGB to HSV for color labeling of each pixel, where eight-pair thresholds corresponding to the Hue ranges of the eight colors are applied. To compensate for the color crosstalk, two morphological openings (i.e., 5×1 and 1×5 structuring elements) are used to separate horizontal and vertical stripes.

To determine the color labels of each intersection (i.e., $c^h_i$, $c^v_i$), a special vote majority rule is applied to a 9×9 neighborhood window of the intersection, where a 360 degree angular search is used to populate the histograms of eight color labels. Each histogram of a particular color label has 18 bins, each of which corresponds to a non-overlapping 20 degree range. The color labels 1; 3; 5; and 7 are used for the horizontal stripes, while 2; 4; 6; 8 for the vertical stripes.

The variable $\rho_\kappa$ (counts the number of observations that fall into each of the κ bins in a histogram and $\rho_\kappa^{cl}$ is a type of $\rho_\kappa$ (in the histogram of the color label cl. The color labels for the intersection can then be determined as follows:

$$c^h_i = g\left(\max_{\substack{cl=1,3,5,7 \\ k=1,2,3...,18}} (\rho_\kappa^{cl})\right)$$

$$c^v_i = g\left(\max_{\substack{cl=2,4,6,8 \\ k=1,2,3...,18}} (\rho_\kappa^{cl})\right)$$

Where g(x): x→cl, cl∈C maps x to its corresponding color label

Although the special vote majority rule substantially minimizes the impact of ill color detection on color labeling for an intersection, there are still errors. In view of those errors, a topological constraint is then used for further correction. If intersections are linked horizontally in the camera image, their correspondences must be collinear. There is more than that. The intersections should have the same color labels as they are on the same horizontally stripe. The same idea should apply to the intersections on the same vertically stripe. Thus when plotting the histogram of the color labels of the intersections on the same row or column, further correction is performed, where the row/column histogram has four bins, each corresponding to one of the four colors used for horizontal/vertical stripes.

$$c^h_i = g(\max(\rho_\kappa^h)), \kappa=1,2,3,4$$

$$c^v_i = g(\max(\rho_\kappa^v)), \kappa=1,2,3,4$$

where $\rho_\kappa^h$ and $\rho_\kappa^v$ are a type of $\rho_\kappa$ □ the histogram of color labels for horizontal and vertical stripes, respectively D. Neighbor Completion Using Hamming Distance Each intersection vi together with its four neighbors forms two unique De Bruijn subsequences, one for the horizontal string i.e., $(\xi^h(Nb_{west}(v_i)), c^h_i, \xi^h(Nb_{east}(v_i)))$ and the other for the vertical string $(\xi^v(Nb_{north}(v_i)),$ i.e., $(\xi^v(Nb_{north}(v_i)), c^v_i, \xi^v(Nb_{south}(v_i)))$ One difficulty in finding the correct correspondences is that not all intersections have complete neighborhood information even after the traversal elaborated as described above. The code words resulted from those so-called imperfect intersections are literally broken, making it impossible to map them to the projected DeBruijn color grid. To this end, our method proposes a Hamming Distance-based amendment procedure. The procedure first defines a function f(vi) that returns color labels of itself and its neighbors' for the intersection $v_i$, $$f(v_i)=[(r_w^v,r_w^h);(c_i^v,c_i^h);(r_n^v,r_n^h);(r_e^v,r_e^h);(r_s^v,r_s^h)]$$

where $$(r_w^v,r_w^h);(r_n^v,r_n^h);(r_e^v,r_e^h);(r_s^v,r_s^h)$$

represent western, northern, eastern, and southern neighbors' horizontal and vertical color labels of $v_i$. If $v_i$ has complete neighborhood information, the value of r can be retrieved from ξ( ) in the grid graph; otherwise, the neighbors are virtual with the colors to be determined through the procedure. The algorithm then traverses the retrieved intersections using a 3×4 or 4×3 moving window, depending on the task of either labeling vertical or horizontal color of the missing neighbors. For each intersection with missing neighbors, the procedure assigns the color labels of its missing neighbors to 0. For instance, if the northern neighbor of $v_i$ is missing, $r_w^v=r_w^h=0$. Doing so makes the originally broken code words complete while invalid. Such an amended but faulty word should have the minimal Hamming distance to its corresponding correct one. According to this idea, the procedure then creates virtual neighbors of each imperfect intersection with correct color labels.

Compared to real intersections, virtual intersections only have color labels without coordinates. The detailed amendment procedure is given in the algorithm shown in FIG. 5. For clarity, the algorithm only includes the procedures of creating virtual neighbors and assigning their vertical color labels. The same procedures except for the moving window size should be applied to determine their horizontal colors.

Figure 5:
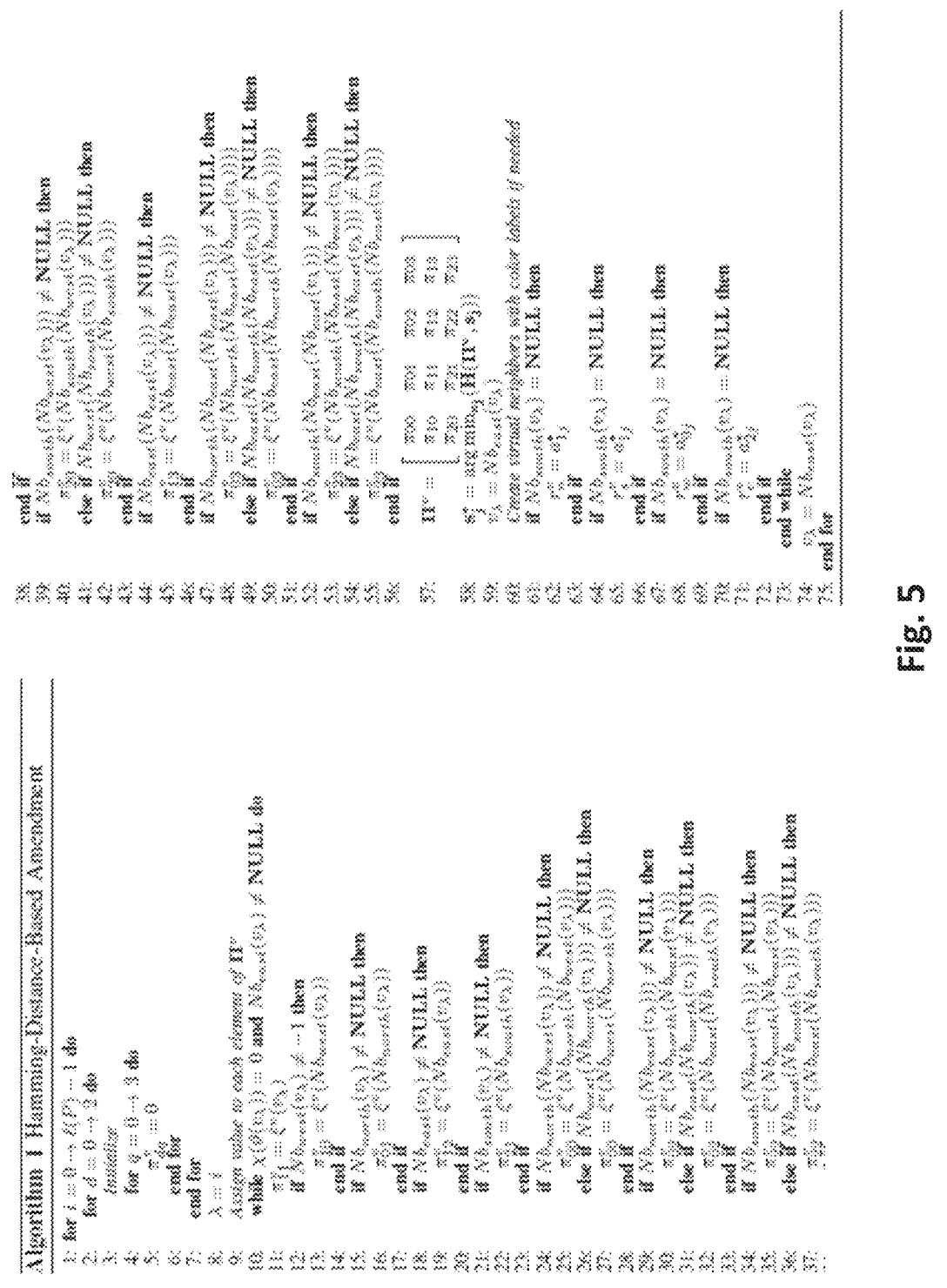

In the algorithm shown in FIG. 5, the inputs are:

G: original retrieved intersection grid.

$h^v=\{s_0,s_1,\ldots s_{m\times m-1}\}$: a matrix set where each element $s_j$ is a 3×4 matrix with each row forming a vertical De Bruijn subsequence $(a_{0j},a_{1j},a_{2j},a_{3j})$ of length 4.

$$s_j = \begin{bmatrix} a_{0j} & a_{1j} & a_{2j} & a_{3j} \\ a_{0j} & a_{1j} & a_{2j} & a_{3j} \\ a_{0j} & a_{1j} & a_{2j} & a_{3j} \end{bmatrix}$$

H: the function for calculating per-element Hamming distance between two matrices. The outputs are:

$r_s^v$, $r_w^v$, $r_e^v$, and $r_n^v$tion grid with virtual neighbors.

The two matrices $\pi^v$ and $\pi^h$ of size 3×4 and 4×3 for horizontal and vertical separatelyExperiments and Results Our implementation setup is composed of a Point Grey FFMV2 color camera with a resolution of 640×480 and an Optima 66HD DLP projector. When the projector projects a color-coded light pattern onto a 3D object, the camera located 1 meter away from the object captures its image. Both camera and projector are calibrated with their intrinsic and extrinsic parameters known.

Figure 3A:
FIG. 3, consisting of FIGS. 3A, 3B, and 3C, is a trio of images which depict a plaster bust (FIG. 3A), a color grid pattern projected onto the plaster bust (FIG. 3B), and an extracted color grid generated from these (FIG. 3C).
Figure 3B:
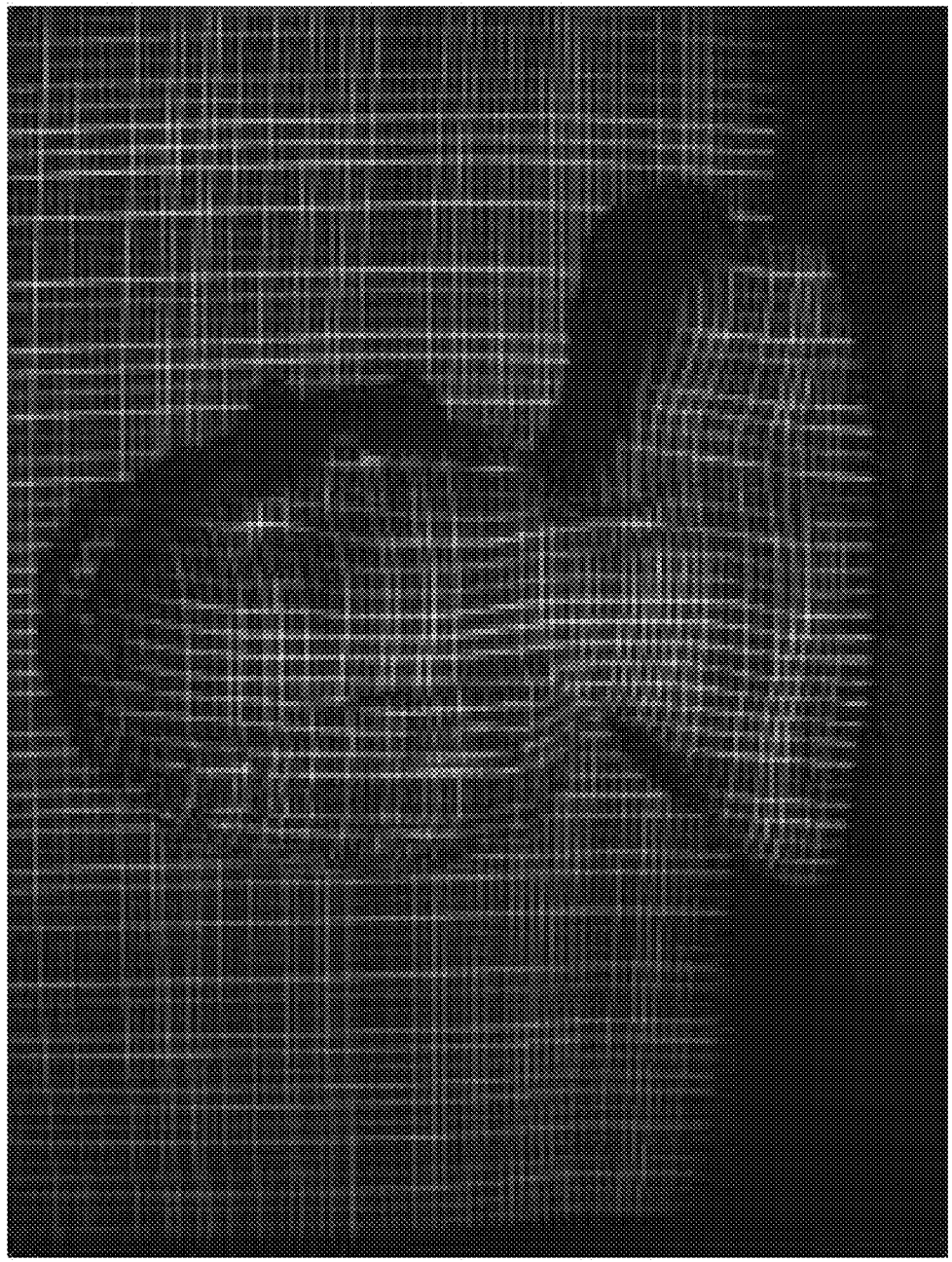
Figure 3C:
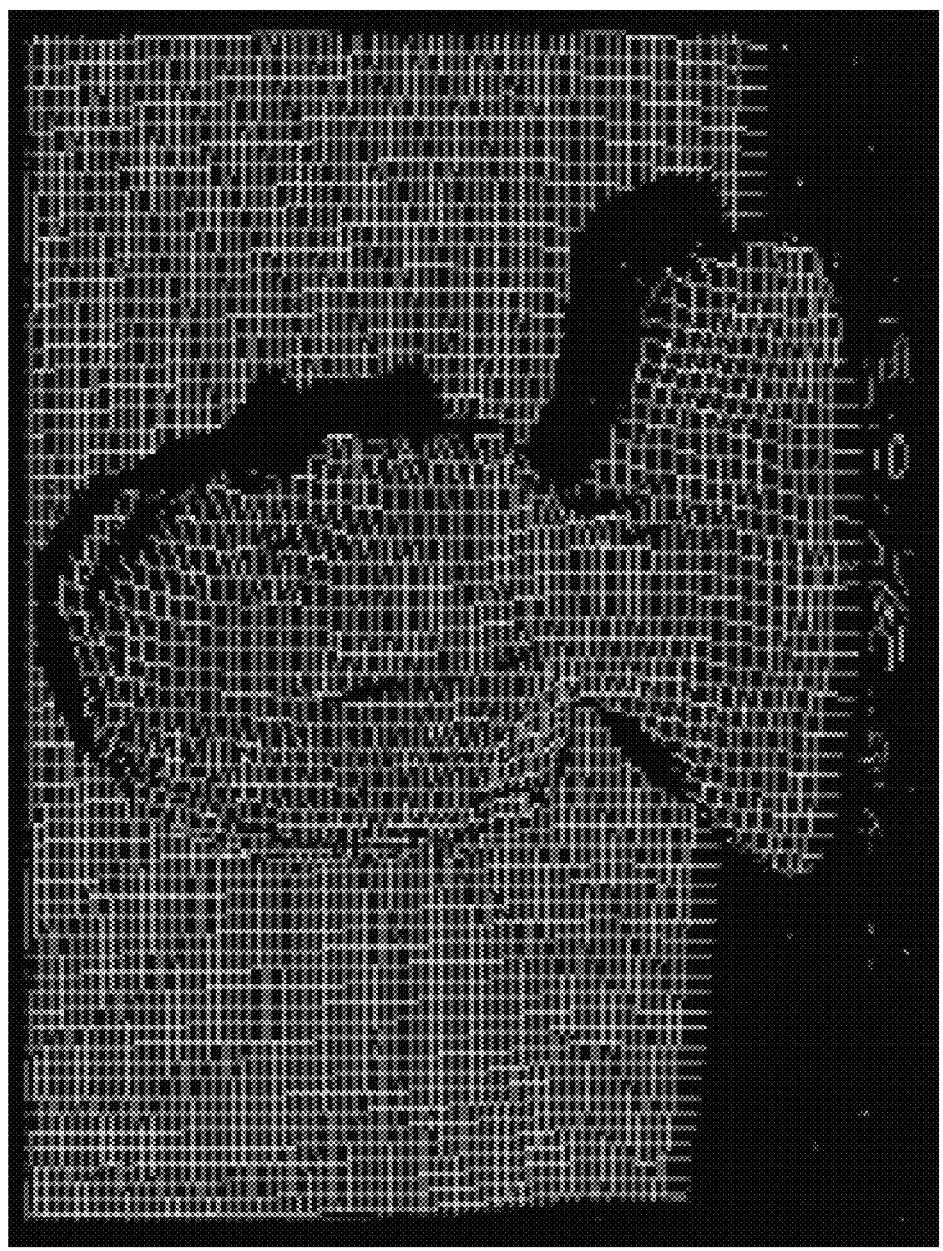

To validate the accuracy of our proposed method, a plaster bust with a complex surface is used in our experiments. The object and the captured intersection network are shown in FIGS. 3A and 3B. The network contains 62×60 color stripes. Due to the highly deformed surface, especially at the hair, eyes, and nose areas, there are several holes, as shown in FIG. 3C. Most of them are due to occlusion distortion. Note that with the help of the watershed algorithm, the impact of sharp depth discontinuity between the background and object is minimal.

Figure 4A:
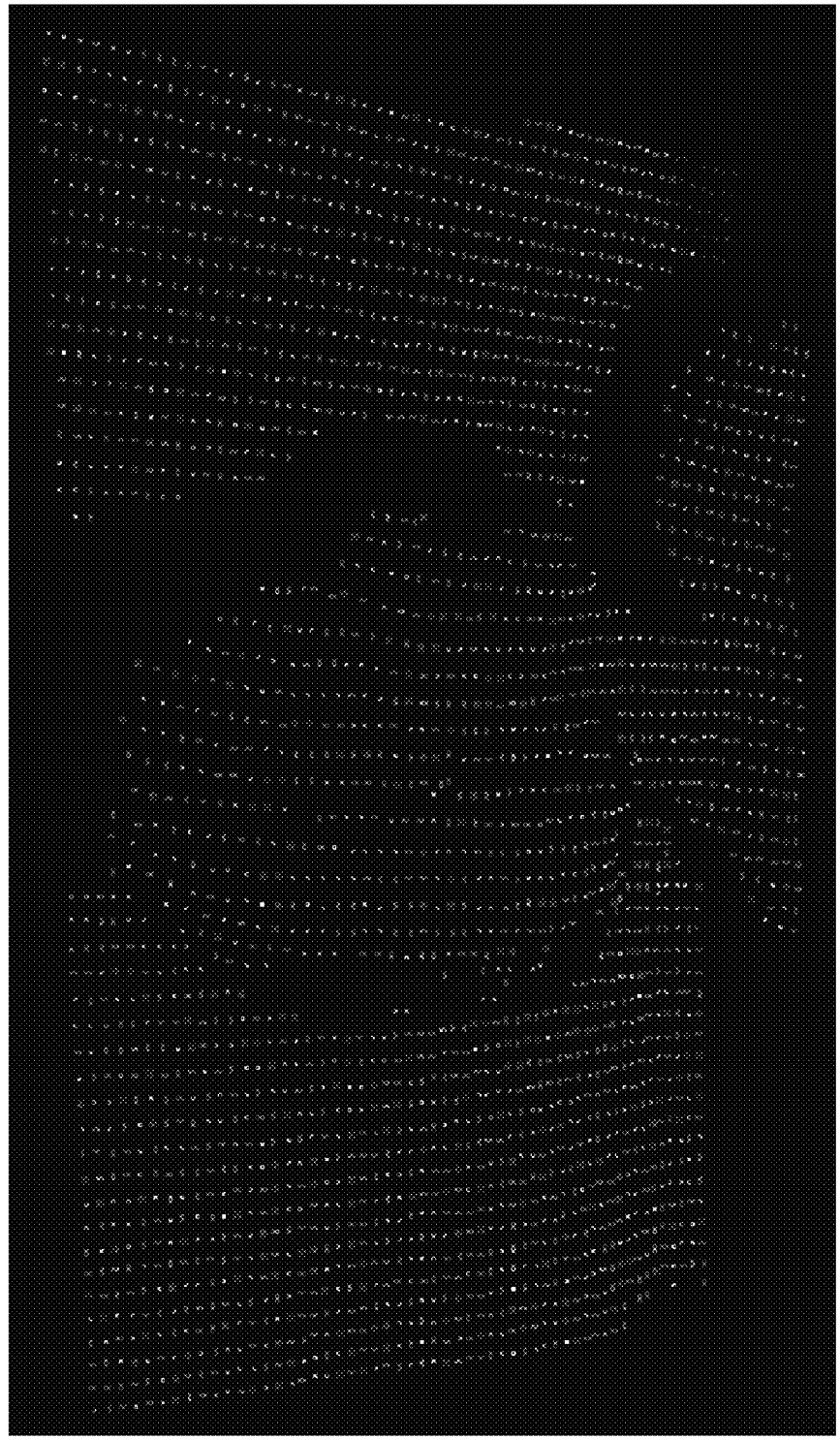
FIG. 4, consisting of FIGS. 4A and 4B, is a pair of images depicting a reconstructed point cloud (FIG. 4A) and a mesh (FIG. 4B) generated for the bust depicted in FIG. 3.
Figure 4B:
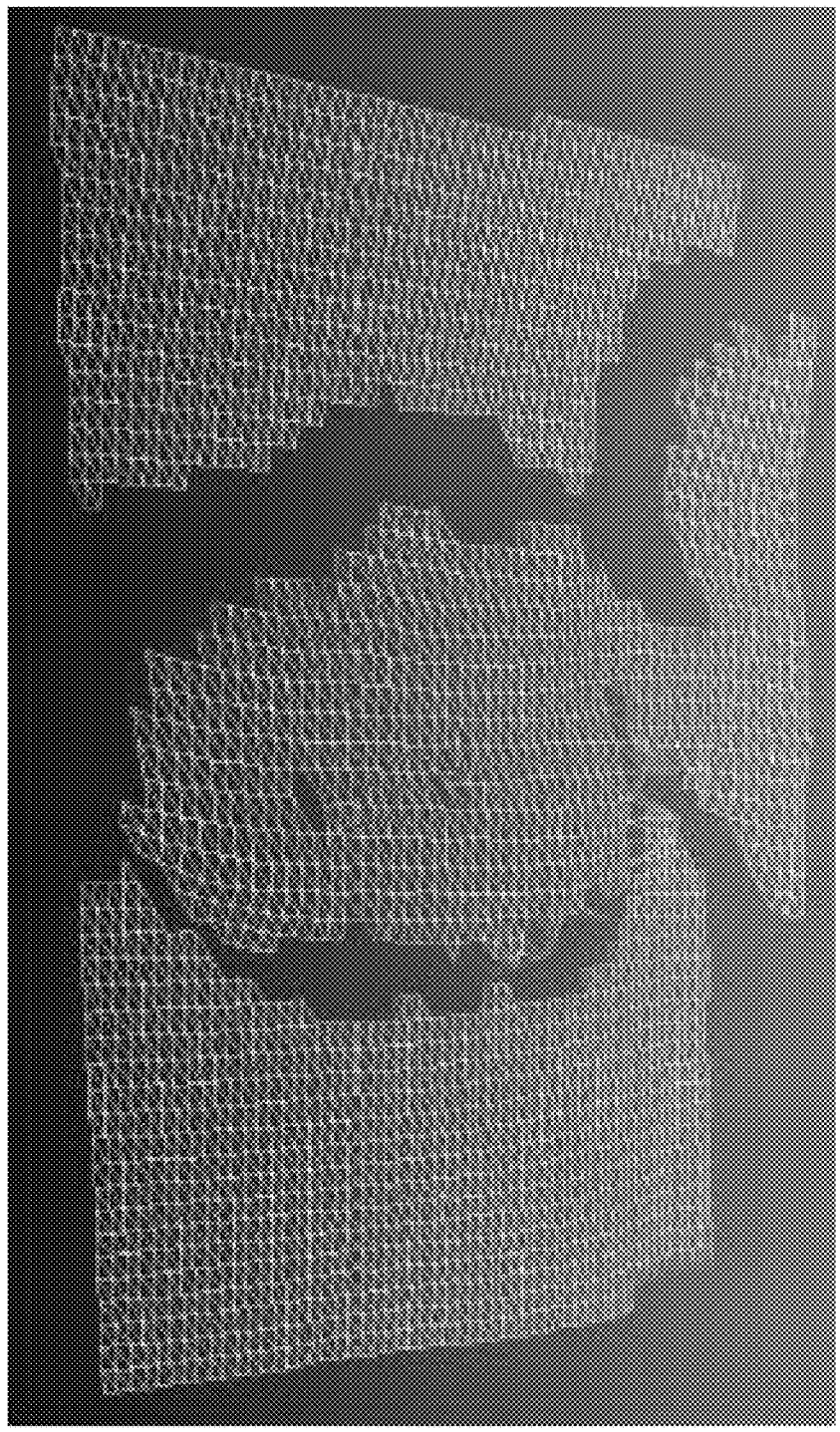

Our reconstruction results are shown in FIGS. 4A and 4B. In the experiment, the total number of intersections in the projected De Bruijn grid (66×66) is 4356. However, four horizontal and six vertical stripes are out of the cameras field of vision, resulting in the size of the captured grid 62×60 with 3720 intersections. Due to occlusion distortion, there are 393 intersections missing, especially in the areas of hair, eyes, and border of the bust and background. With this ground truth, our method is able to recover 3327 intersections with 267 labeled wrong and 110 containing incomplete neighborhood information. This corresponds to 88:6% correct assignment. The reconstructed point cloud and mesh are shown in FIG. 4.

With the focus on local optimization, such as the vote majority rule for color detection and correction, and DeBruijn-based Hamming distance to improve neighborhood information of intersections, our method achieves the best speed in comparison to existing one-short methods (e.g., A. Ulusoy, F. Calakli, and G. Taubin, "Robust one-shot 3d scanning using loopy belief propagation," in Computer Vision and Pattern Recognition Workshops (CVPRW), 2010 IEEE Computer Society Conference on, June 2010, pp. 15-22; S. Chen, Y. Li, and J. Zhang, "Vision processing for realtime 3-d data acquisition based on coded structured light," Image Processing, IEEE Transactions on, vol. 17, no. 2, pp. 167-176, February 2008).

In unoptimized C++ code, the running time for 3327 grid intersections was about 1 second on a desktop with an Intel i7-2600k CPU with four cores (3.40 GHz) along with 8G DDR3 1600 memory, and the operating system is Windows 7 64 bit version.

Conclusion

This disclosure describes a fast, one-shot, real-time 3D reconstruction method using DeBruijn encoded color pattern. Unlike previous one-shot approaches, our formulation focuses on local optimization, where a Hamming distance minimization method is used for finding missing topological information and a special vote majority rule is applied for color detection and correction. The disclosed method is shown to be efficient with a desirable accuracy achieved, even when applied to a very complicated scene. With the focus on mobile applications, such as mobile augmented reality, we emphasize more on speed over accuracy as 3D information is only used for rendering a live model based on limited feature points in the application.

The disclosure of every patent, patent application, and publication cited herein is hereby incorporated herein by reference in its entirety.

While this subject matter has been disclosed with reference to specific embodiments, it is apparent that other embodiments and variations can be devised by others skilled in the art without departing from the true spirit and scope of the subject matter described herein. The appended claims include all such embodiments and equivalent variations.

What is claimed is:

1. A method of tracking an object in a scene, the method comprising detecting at least three points of an object in a scene and using a projector to project structured light pattern on the scene, the structured light pattern including intersecting monochromatic lines, wherein at least six of the lines are different colors, and thereafter using an imaging device to capture an image of the scene including the object and the structured light pattern and calculating the positions, relative to the imaging device, of at least the three points by detecting the intersections of the lines in the image, traversing through the detected intersections to identify neighboring nodes, determining the identity of each detected intersection based on its color and the color of its neighboring nodes, and triangulating the position of intersections corresponding to the at least the three points to track the object in the scene.

2. The method of claim 1, wherein the structured light pattern is a DeBruijn grid.

3. The method of claim 2, wherein the DeBruijn grid includes lines of at least eight different colors.

4. The method of claim 1, further comprising, at a later time, using an imaging device to capture another image of the scene including the object and the structured light pattern, calculating the positions, relative to the imaging device, of at least the three points at the later time, and comparing the positions of the three points at the two times to determine the motion of the object over time.

5. The method of claim 4, further comprising repeating the steps of using, calculating, and comparing multiple times.

6. A system for tracking an object in a scene, the system comprising a projector for projecting a structured light pattern on the scene, the structured light pattern including intersecting monochromatic lines, wherein at least six of the lines are different colors, an imaging device for capturing an image of the scene, including the object and the structured light pattern, a first processor for coordinating operation of the projector and the imaging device, and a second processor for calculating the positions, relative to the imaging device, of at least three points of the object by detecting the intersections of the lines in the image, traversing through the detected intersections to identify neighboring nodes, determining the identity of each detected intersection based on its color and the color of its neighboring nodes, and triangulating the position of intersections corresponding to the at least the three points to track the object in the scene.

7. The system of claim 6, wherein the first processor and the second processor are the same processor.

8. A hand-held device comprising the system of claim 6.

9. The device of claim 8, further comprising a cellular telephone.

10. The device of claim 8, being linked with a wide area network.

11. The device of claim 10, wherein the wide area network is the Internet.

12. A vehicle comprising the system of claim 6 operably linked with a navigation system of the vehicle.

13. A device for displaying contextual information on a device when the device is situated in a selected proximity to an object, the device comprising a projector for projecting a structured light pattern toward the object, an imaging device for capturing an image including the object and the structured light pattern, a display for displaying an image of the object and the contextual information, and at least one processor for a) calculating the proximity of the display device to the object and b) displaying the contextual information on the display when the device is situated within the selected proximity.

* * * * *